(12) United States Patent
Sugiyama et al.

(10) Patent No.: US 6,829,256 B2
(45) Date of Patent: Dec. 7, 2004

(54) FIBER LASER APPARATUS AS WELL AS OPTICAL MULTI/DEMULTIPLEXER AND IMAGE DISPLAY APPARATUS THEREFOR

(75) Inventors: Tooru Sugiyama, Kumagaya (JP); Naoki Akamatsu, Kumagaya (JP); Kiyoyuki Kawai, Tokyo (JP); Hideaki Okano, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 10/261,605

(22) Filed: Oct. 2, 2002

(65) Prior Publication Data

US 2003/0086446 A1 May 8, 2003

(30) Foreign Application Priority Data

Oct. 19, 2001 (JP) ........................................ 2001-322171
Dec. 25, 2001 (JP) ........................................ 2001-392674

(51) Int. Cl.[7] .............................................. H01S 3/30
(52) U.S. Cl. ............................. 372/6; 372/43; 372/75; 372/92; 372/99; 372/101
(58) Field of Search .............................. 372/6, 43, 75, 372/92, 99, 101

(56) References Cited

U.S. PATENT DOCUMENTS

| 5,136,666 | A | * | 8/1992 | Anderson et al. ............. 385/24 |
| 5,703,987 | A | * | 12/1997 | Imoto ........................ 385/126 |
| 6,320,885 | B1 | | 11/2001 | Kawai et al. |
| 2003/0086446 | A1 | * | 5/2003 | Sugiyama et al. ............. 372/6 |

FOREIGN PATENT DOCUMENTS

| JP | 7-226551 | 8/1995 |
| JP | 9-232654 | 9/1997 |
| JP | 11-233863 | 8/1999 |
| JP | 2000-339735 | 12/2000 |
| JP | 2001-203412 | 7/2001 |
| JP | 2001-251002 | 9/2001 |

OTHER PUBLICATIONS

Tohmon et al.; "Thulium: ZBLAN blue fiber laser pumped by two wavelengths," Applied Optics, vol. 36, No. 15, May 20, 1997.

Paschotta et al., "230 mW of Blue Light from a Thulium–Doped upconversion Fiber Laser," IEEE Journal of Selected Topics in Quantum Electronics, vol. 3, No. 4, Aug. 1997.

Allain et al., "Blue upconversion fluorozirconate fibre laser," Electronics Letters, vol. 26, No. 3, 1st Feb. 1990.

J. Y. Allain et al., "Red Upconversion Yb–Sensitised Pr Fluoride Fibre Laser Pumped in 0.8 $\mu$m Region," Electronics Letters, Jun. 20, 1991, vol. 27, No. 13, pp. 1156–1157.

Office Action, dated May 18, 2004 from the Japanese Patent Office for Patent Application No. 2001–392674.

Sandrock et al., "High–Power Continuous–Wave Upconversion Fiber Laser at Room Temperature," Optics Letters, vol. 22, Jun. 1, 1997, pp. 808–810.

* cited by examiner

*Primary Examiner*—Don Wong
*Assistant Examiner*—Delma R. Flores-Ruiz
(74) *Attorney, Agent, or Firm*—Pillsbury Winthrop LLP

(57) ABSTRACT

Light from a first excitation light source is incident on one facet of a first optical fiber. A core is doped with a first rare earth substance. A resonant section induces light resonance in the core to generate resonant light, thereby providing selected light at the other facet of the first optical fiber. An optical multi/demultiplexer reflects the light of the selected wavelength in a direction different from that of the first optical fiber. A second excitation light source supplies light to the resonant section of the first optical fiber via the optical multi/demultiplexer and the other facet of the first optical fiber. A second optical fiber guides the light of the selected wavelength from the optical multi/demultiplexer to an exterior.

17 Claims, 17 Drawing Sheets

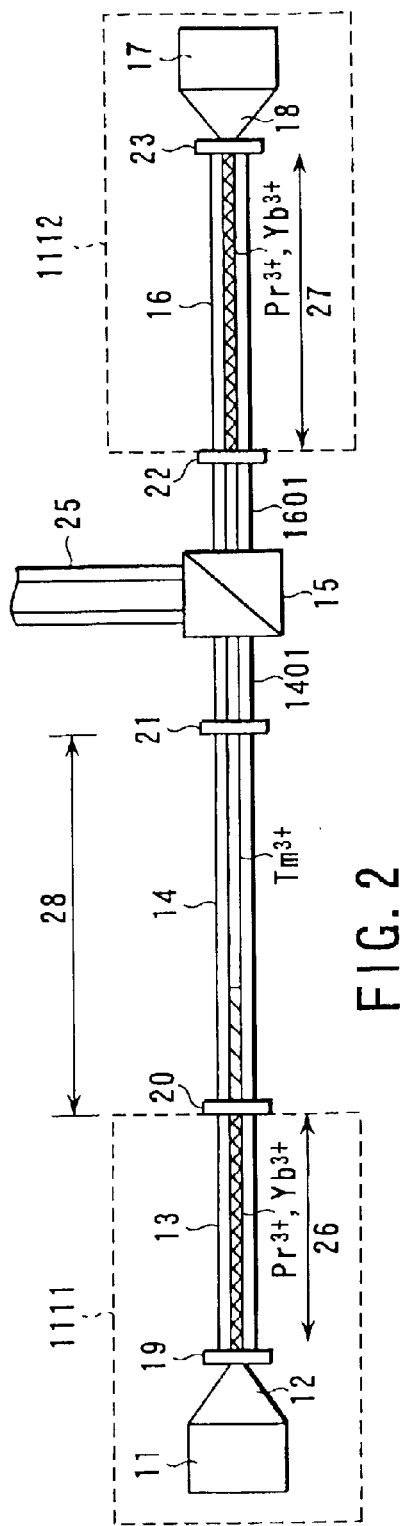
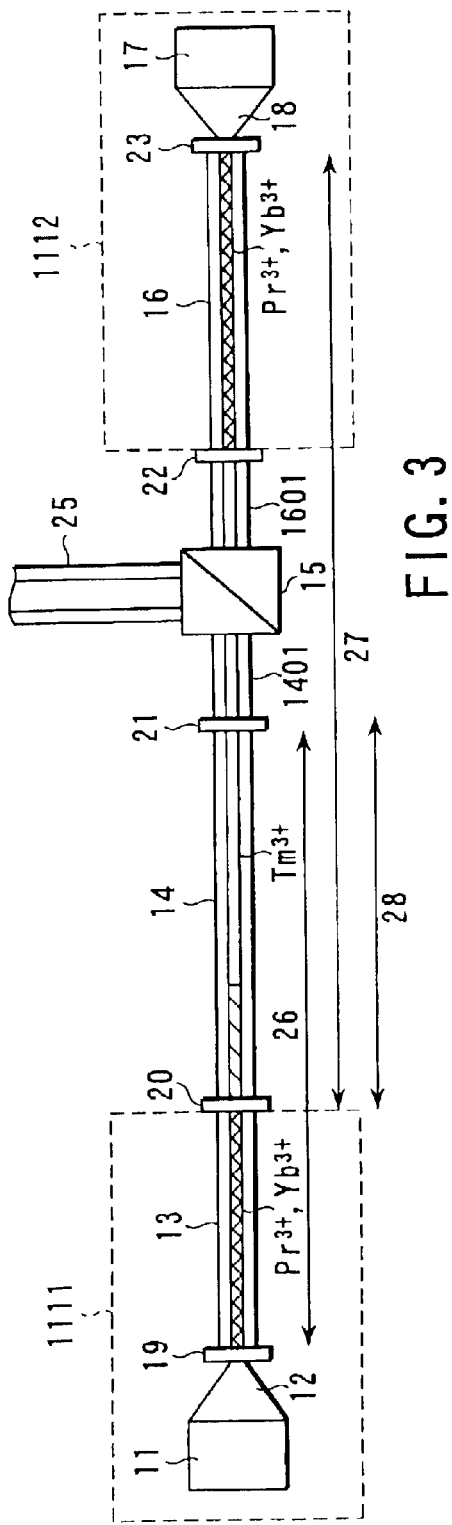
FIG. 2
FIG. 3

FIBER LASER APPARATUS AS WELL AS OPTICAL MULTI/DEMULTIPLEXER AND IMAGE DISPLAY APPARATUS THEREFOR

CROSS-REFERENCE TO RELATED APPLICATIONS

This application is based upon and claims the benefit of priority from the prior Japanese Patent Applications No. 2001-322171, filed Oct. 19, 2001; and No. 2001-392674, filed Dec. 25, 2001, the entire contents of both of which are incorporated herein by reference.

BACKGROUND OF THE INVENTION

1. Field of the Invention

The present invention relates to a fiber laser apparatus which uses a semiconductor laser as an excitation light source to obtain blue laser light using a simple configuration, and an optical multi/demultiplexer that takes laser light out of the fiber laser apparatus.

2. Description of the Related Art

Lasers are desired to emit light with a wavelength equal to that of blue light. This is because such lasers are expected to be applicable to various fields such as displays, optical storage devices, optical information processing, and optical sensors. Of these fields, a typical field that requires high optical power per unit area (optical power (optical density)) is optical storage devices. On the other hand, for applications such as displays, oscillation wavelength is important and significantly high power (optical density) is not required.

As a laser apparatus that emits blue light, an apparatus has been proposed which obtains blue laser light by doping a core of an optical fiber with thulium ions $Tm^{3+}$ and carrying out upconversion excitation.

For example, Jpn. Pat. Appln. KOKAI Publication No. 7-226551 discloses a laser light source apparatus based on an upconversion method.

An optical fiber has a core portion doped with $Tm^{3+}$ and $Tb^{3+}$ ions. Laser light of wavelength 640 to 650 nm emitted by a semiconductor laser as a first excitation light source and laser light of wavelength 670 to 810 nm emitted by a semiconductor laser as a second excitation light source are multiplexed by a multiplexer and then input to one end of an optical fiber. The laser lights excite $Tm^{3+}$ in the optical fiber to emit light of wavelength 455 nm. The emitted light is repeatedly reflected and amplified by an optical resonator formed in the optical fiber and is then output from the other end of the optical fiber as laser light.

The core portion is doped with $Tm^{3+}$ in order to allow the energy level of electrons in the core portion to increase up to that of laser light of wavelength 455 nm.

As shown in the above conventional example, it is efficient to use two lights with different wavelengths to excite $Tm^{3+}$. Further, as high optical power (optical density) as possible is desirably used to excite $Tm^{3+}$. However, in order to take output light out from one facet of the optical fiber, two lights with different wavelengths must be incident on the other facet of the optical fiber as in the case of this example. As a result, a multiplexer is required which synthesizes two lights of different wavelengths. Consequently, an optical axis must be adjusted at more locations, i.e. between the two semiconductor lasers and the multiplexer and between the multiplexer and the optical fiber. Further, both lights require similarly accurate adjustments, thereby increasing parts and manufacture costs. Therefore, disadvantageously, the apparatus may become expensive.

As an inexpensive multiplexer, a waveguide (Y-shaped waveguide) may be designed in which a core is Y-shaped to provide a plurality of entrance portions. In this case, however, incident light exceeds a critical angle at a merging portion, and is partially radiated out from the core. Thus, optical power (optical density) cannot be increased.

Further, high-power semiconductor lasers of wavelength 650 nm (a wavelength with high energy) are still expensive and are not easily available.

Furthermore, a fiber laser that outputs light of wavelength 635 nm is disclosed in, for example, T. Sandrock et. al. "High-power continuous wave upconversion fiber laser at room temperature", Optics letters, vol. 22, No. 11, Jun. 11, 1997. According to this document, high-power laser light of wavelength 635 nm (a wavelength of high energy) is obtained using as an excitation light source a titanium sapphire laser that provides output light of wavelength 850 nm (a wavelength with high energy) and using an optical laser doped with $Pr^{3+}$ and $Yb^{3+}$ ions. With the values shown in this report, the power density of excitation light incident on the core, measured at an oscillation threshold value of the fiber laser, can be estimated at about 0.4 $MW/cm^2$.

On the other hand, presently available high-power infrared emission semiconductor lasers typically provide optical power (optical density) of about 1.0 $MW/cm^2$ at a facet of the chip. This value is slightly larger than that of the excitation light power in the above report. Furthermore, a beam from the semiconductor laser has a large spread angle of ±10 to 20° in the direction of chip thickness and ±several degrees in the direction of chip width. Thus, it is virtually impossible to further improve optical power (optical density) while maintaining incidence efficiency even with condensation carried out by an optical system. Further, optical power (optical density) cannot be increased even by using a Y-shaped waveguide and a plurality of semiconductor lasers, as described above. Thus, disadvantageously, semiconductor lasers provide low optical power (optical density).

That is, in the prior art, as described above, two semiconductor lasers are used, and lights of different wavelengths from these lasers are incident on one facet of an optical fiber doped with $Tm^{3+}$. This conventional method requires a multiplexer and also requires that the optical axis be adjusted at more locations. Accordingly, both lights require similarly accurate adjustments, thereby increasing parts and manufacture costs. Further, disadvantageously, optical power (optical density) cannot be increased by the method of using a Y-shaped waveguide to multiplex two lights from different lasers.

BRIEF SUMMARY OF THE INVENTION

It is an object of the present invention to provide a fiber laser apparatus which uses two excitation light sources emitting lights of different wavelengths, to obtain a light beam of a desired wavelength (color) on the basis of light resonance effected using the excitation light sources as well as an optical multi/demultiplexer and an image display device therefor.

To attain this object, according to an aspect of the invention, there is provided a fiber laser apparatus comprising a first excitation light source, a first optical fiber on which light from the first excitation light source is incident through one facet thereof, in which a core is doped with a first rare earth substance, and in which light resonance occurs in the core, the first excitation light source having a resonant section formed therein to output light of a selected wavelength from the other facet thereof, the light of the selected wavelength being included in light of a resonant wavelength; an optical multi/demultiplexer arranged at the other facet of the first optical fiber to reflect and output the light of the selected wavelength in a direction different from that of the first optical fiber; a second excitation light source which supplies light to the resonant section of the first optical fiber via the multi/demultiplexer and the other facet of the first optical fiber; and a second optical fiber which guides the light of the selected wavelength from the optical multi/demultiplexer to an exterior.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 2 is a diagram illustrating the configuration of another embodiment of the fiber laser apparatus according to the present invention;

FIG. 3 is a diagram illustrating the configuration of yet another embodiment of the fiber laser apparatus according to the present invention;

DETAILED DESCRIPTION OF THE INVENTION

Embodiments of the present invention will be described below in detail with reference to the drawings.

Figure 1:
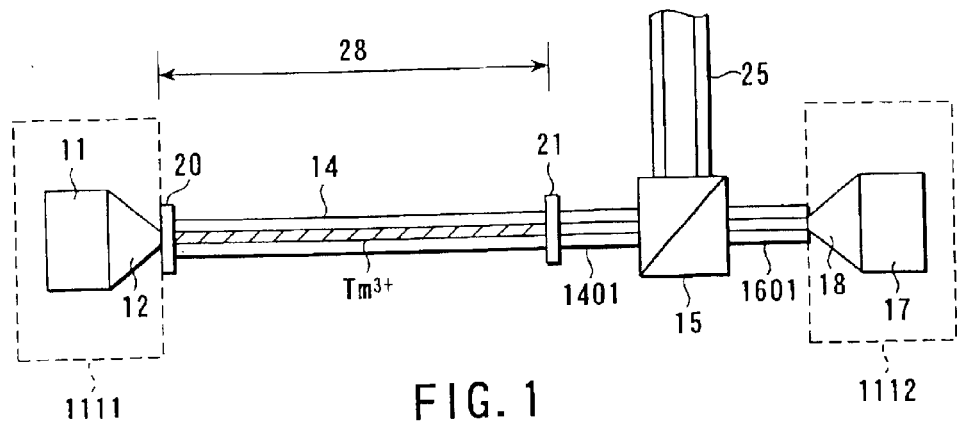
FIG. 1 is a diagram illustrating the configuration of a basic embodiment of a fiber laser apparatus according to the present invention.

First, the basic configuration of a fiber laser apparatus according to the present invention will be described with reference to FIG. 1. In this figure, a first excitation light source 1111 is composed of, for example, a semiconductor laser 11 and a condensing element 12 that condenses excitation light output by the semiconductor laser 11.

A second excitation light source 1112 is composed of, for example, a semiconductor laser 17 and a condensing element 18 that condenses excitation light output by the semiconductor laser 17.

Excitation light condensed by the condensing element 12 is incident on a core of a first optical fiber 14 from one facet thereof via a reflection element 20. The first optical fiber 14 has a reflection element 21 provided at the other facet thereof. The core of the first optical fiber 14 is doped with $Tm^{3+}$. The reflection elements 20 and 21 constitute a resonator 28. The specific principle of this resonator will be described later.

The other facet of the first optical fiber 14 is joined to a wavelength selecting element as wavelength selection output means via the reflection element 21 and an optical fiber 1401. This element 15 is an optical multi/demultiplexer. An example of such an optical multi/demultiplexer is a WDM (Wavelength Division Multiplexing) coupler.

Next, excitation light from the second excitation light source is guided to the core of the first optical fiber 14 via an optical fiber 1601 and the optical multi/demultiplexer. Light resonance occurs in a resonator 28. Of light with a resonant wavelength, light of a predetermined wavelength from the resonator 28 is incident on the optical multi/demultiplexer 15. The optical multi/demultiplexer 15 has a reflecting section that reflects the light of the desired wavelength to reflect and output the light in a direction different from that of the first optical fiber 14.

The light of the desired wavelength taken out of the optical multi/demultiplexer 15 is emitted to the exterior via the second optical fiber 25.

Now, the operation of the fiber laser apparatus will be described. The first excitation light source 1111 outputs light of wavelength 635 nm. The light of wavelength 635 nm is incident on the first optical fiber 14 via the optical waveguide 12. On the other hand, the second excitation light source 1112 outputs light of wavelength 695 nm. The light of wavelength 695 nm is incident on the first optical fiber 14 via the optical waveguide 18, the optical fiber 1601, the optical multi/demultiplexer 15, and the optical fiber 1401. The lights of wavelengths 635 nm and 695 nm incident on the optical fiber 14 are absorbed by $Tm^{3+}$ in the core to generate light of wavelength 455 nm. The light of wavelength 455 nm is repeatedly reflected and amplified between the reflection elements 20 and 21 to cause resonance. As a result, this light becomes laser light having a desired wavelength (455 nm). The reflection element 21 has a smaller reflectance than the reflection element 20. Thus, the laser light is partially transmitted through the reflection element 21 and is then incident on the optical multi/demultiplexer 15. The optical multi-demultiplexer 15 has an inwardly tilted reflecting section which is characterized by reflecting light of wavelength 455 nm. Light reflected by the reflecting section is incident on the second optical fiber 25. The second optical fiber 25 outputs the light of wavelength 455 nm to the exterior of the fiber laser apparatus.

According to the above described fiber laser apparatus, the first and second excitation light sources supply lights of the different wavelengths to the resonant section to obtain light of the desired wavelength. In this case, the supply of light from the first and second excitation light sources to the resonant section 28 requires only a simple arrangement because the light is supplied from the opposite facets of the optical fiber 14. Thus, light resonance is efficiently effected without any optical losses. That is, optical power (optical density) can be increased.

The present invention is not limited to the above embodiment, but may be varied.

FIG. 2 shows a second embodiment of the present invention. In the description of the example in FIG. 1, the first and second excitation light sources are each composed of a semiconductor laser and an optical waveguide. In the second embodiment, however, the first and second excitation light sources are each composed of a fiber laser light source. In the following description, the same functional sections as those of the example in FIG. 1 are denoted by the same reference numerals.

That is, the first excitation light source 1111 is composed of the semiconductor laser 11, the optical waveguide 12, a third optical fiber 13, a reflection element 19, and the reflection element 20. In this case, a core of the third optical fiber 13 is doped with rare earth. The dopant is $Pr^{3+}$ or $Yb^{3+}$.

Further, a second excitation light source 1112 is composed of the semiconductor laser 17, the optical waveguide 18, a fourth optical fiber 16, and reflection elements 23 and 22. Also in this case, a core of the fourth optical fiber 16 is doped with rare earth. The dopant is $Pr^{3+}$ or $Yb^{3+}$.

In the first excitation light source 1111, the semiconductor laser 11 outputs laser light of, for example, wavelength 850 nm. The reflection element 19 allows the light of wavelength 850 nm to totally pass therethrough. Further, the reflection element 19 reflects light of wavelength 635 nm from the reflection element 20. Furthermore, the reflection element 20 reflects light of wavelength 635 nm from the reflection element 19. The reflection element 20 also reflects light of wavelength 455 nm from the reflection element 21.

Light of wavelength 850 nm from the semiconductor laser 11 is absorbed by the dopant $Pr^{3+}$ or $Yb^{3+}$ in the core of the third optical fiber 13, via the optical waveguide 12. In the core, light of wavelength 635 nm is generated. The light of wavelength 635 nm is repeatedly reflected by the reflection elements 19 and 20 to become laser light. The reflection elements 19 and 20 constitute a resonator 26.

The reflection element 20 has a smaller reflectance than the reflection element 19. Thus, the light of wavelength 635 nm exits the reflection element 20 and is incident on the resonator 28.

On the other hand, in the second excitation light source 1112, the semiconductor laser 17 outputs laser light of, for example, wavelength 850 nm. The reflection element 23 allows the light of wavelength 850 nm to totally pass therethrough. Further, the reflection element 23 reflects light of wavelength 695 nm from the reflection element 22. Furthermore, the reflection element 22 reflects light of wavelength 695 nm from the reflection element 23.

Light of wavelength 850 nm from the semiconductor laser 17 is absorbed by the dopant $Pr^{3+}$ or $Yb^{3+}$ in the core of the fourth optical fiber 16, via the optical waveguide 18. In the core, light of wavelength 695 nm is generated. The light of wavelength 695 nm is repeatedly reflected by the reflection elements 22 and 23 to become laser light. The reflection elements 22 and 23 constitute a resonator 27. The reflection element 22 has a smaller reflectance than the reflection element 23. Thus, the light of wavelength 695 nm exits the reflection element 22 and is incident on the resonator 28 via the optical multi/demultiplexer 15.

As described above, the resonator 28 receives the light of wavelength 625 nm from the first excitation light source 1111 and the light of wavelength 695 nm from the second excitation light source 1112. The subsequent operation is as described for the embodiment in FIG. 1.

That is, the lights of wavelengths 635 nm and 695 nm incident on the optical fiber 14 are absorbed by $Tm^{3+}$ in the core to generate light of wavelength 455 nm. The light of wavelength 455 nm is repeatedly reflected and amplified between the reflection elements 20 and 21 to cause resonance. As a result, this light becomes laser light having a desired wavelength (455 nm). The reflection element 21 has a smaller reflectance than the reflection element 20. Thus, the laser light is partially transmitted through the reflection element 21 and is then incident on the optical multi/demultiplexer 15. The optical multi-demultiplexer 15 has an inwardly tilted reflecting section which is characterized by reflecting light of wavelength 455 nm. Light reflected by the reflecting section is incident on the second optical fiber 25. The second optical fiber 25 outputs the light of wavelength 455 nm to the exterior of the fiber laser apparatus.

The present invention is not limited to the above embodiments. In the present invention, two excitation light sources are basically used to obtain a light beam with a desired wavelength (color) utilizing resonance based on the excitation light sources. In this case, the output light has sufficient power, and the configuration of the apparatus is simple.

In the above embodiments, laser light of wavelength 635 nm is provided by the resonator 26 (implemented by the optical fiber 13 and the reflection element 19 and 20). Further, laser light of wavelength 695 nm is provided by the resonator 27 (implemented by the optical fiber 16 and the reflection element 22 and 23). However, the locations where the resonators 26 and 26 are constructed are not limited to those shown in the above example.

FIG. 3 shows a third embodiment of the present invention. In the following description, the same functional sections as those in the embodiments described previously are denoted by the same reference numerals. That is, in this embodiment, the resonator 26 is constructed between the reflection elements 19 and 21. The resonator 27 is constructed between the reflection elements 20 and 23. In this embodiment, the reflection element 20 has its characteristics set so as to allow light of wavelength 635 nm to pass therethrough rightward. Further, the reflection element 20 has its characteristics set so as to reflect lights of wavelengths 695 nm and 455 nm rightward. Furthermore, the reflection element 21 has its characteristics set so as to reflect light of wavelength 635 nm and part of light of wavelength 455 nm, while allowing light of wavelength 635 nm travelling from the right side to pass therethrough. Thus, the resonator 26 resonates and amplifies light of wavelength 645 nm. The resonator 27 resonates and amplifies light of wavelength 695 nm.

In the above embodiments, the optical fiber 1401 is provided at the facet of the optical fiber 14. However, a reflection element (mirror) may be provided at the facet of the optical fiber 14 by vapor deposition. Then, the thus formed end of the optical fiber may be attached directly to the optical multi-demultiplexer. In this case, the optical fiber 1401 may be omitted. Further, in the examples in FIGS. 2 and 3, the optical fiber 1601 may be omitted and the optical fiber 16 may be attached directly to the optical multi/demultiplexer.

The technical contents and alternative embodiments of the present invention will be described below in detail.

First, the basic principle of operation of the present invention will be described with reference to FIG. 4.

Figure 4:
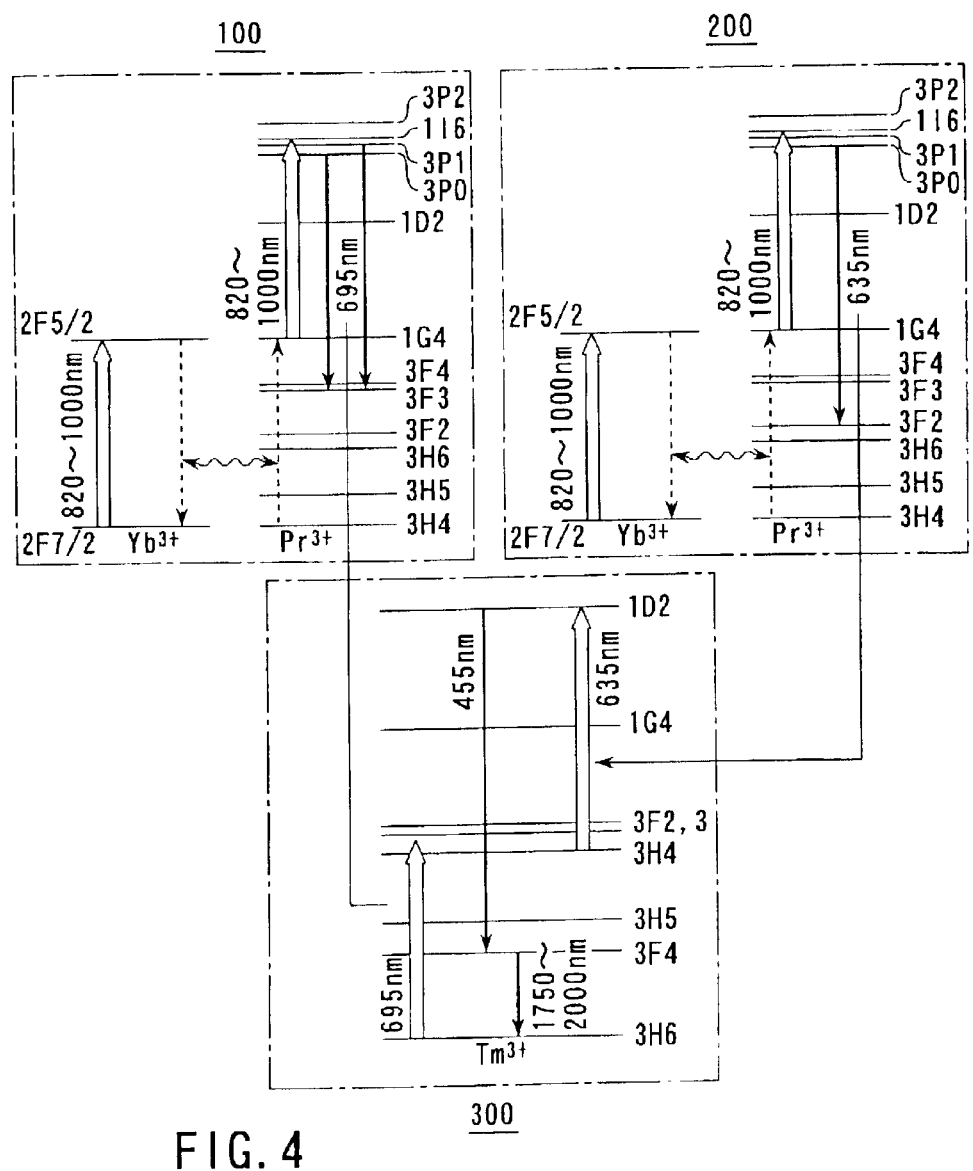
FIG. 4 is a diagram showing energy levels and used to describe the fundamental principle of operation of the fiber laser apparatus according to the present invention.

FIG. 4 shows the energy level 100 of $Pr^{3+}/Yb^{3+}$ in a first $Pr^{3+}/Yb^{3+}$ doped optical fiber, the energy level 200 of $Pr^{3+}/Yb^{3+}$ in a second $Pr^{3+}/Yb^{3+}$ doped optical fiber, and the energy level 300 of $Tm^{3+}$ in a $Tm^{3+}$ doped optical fiber.

First, in FIG. 4, when external light of wavelength 820 to 1,000 nm is incident on the first and second optical fibers, electrons in $Yb^{3+}$, which have a base energy level $^2F_{7/2}$, are excited to increase the energy level thereof up to $^2F_{5/2}$. Then, as the energy level decreases down to the base level $^2F_{7/2}$, energy is transmitted to $Pr^{3+}$, which is present near $Yb^{3+}$. This excites electrons in $Pr^{3+}$, which have a base energy level $^3H_4$. Furthermore, excitation light of wavelength 820 to 1,000 nm is absorbed by $Pr^{3+}$ to increase the energy level thereof up to $^3P_0$, $^3P_1$, or $^1I_6$.

Then, as the electrons have their energy level decrease while radiating energy, i.e. the energy level transition $^3P_1 \rightarrow ^3F_4$ or $^3P_0 \rightarrow ^3F_3$ occurs, light radiation of wavelength 695 nm (a wavelength with high energy) is obtained. If the energy level transition $^3P_0 \rightarrow ^3F_2$ occurs, light radiation of wavelength 635 nm is obtained.

Thus, when the first and second $Pr^{3+}/Yb^{3+}$ doped optical fibers have optical resonance functions of resonating when subjected to light of wavelength 695 and 635 nm, respectively, laser lights of wavelengths 695 and 635 nm, respectively.

Then, the laser lights of wavelengths 695 and 635 nm are used to excite $Tm^{3+}$ in the $Tm^{3+}$ doped optical fiber. Electrons in $Tm^{3+}$, which have a base energy level $^3H_6$, absorb excitation light of wavelength 695 nm generated in the first $Pr^{3+}/Yb^{3+}$ doped optical fiber. Thus, the energy level of the electrons increases up to $^3F_2$ or $^3F_3$. The lifetimes of these energy levels are very short, and these electrons have their energy level decrease rapidly down to $^3H_4$, while radiating energy.

The electrons having the energy level $^3H_4$ further absorb excitation light of wavelength 635 nm generated in the second $Pr^{3+}/Yb^{3+}$ doped optical fiber. Thus, the energy level of the electrons increases up to $^1D_2$. Then, as the electrons have their energy level decrease from $^1D_2$ to $^3F_4$, while radiating energy, blue light of wavelength 455 nm (a wavelength with high energy) is obtained.

Then, if an inverted population is obtained, i.e. the molecular density of the electrons is higher at $^1D_2$ than at $^3F_4$, laser oscillation of wavelength 455 nm can be effected. However, the lifetime of the energy level $^3F_4$ is very long, i.e. about 6 ms. Consequently, the inverted population is normally not obtained.

Thus, the $Tm^{3+}$ doped optical fiber is provided with an optical resonance function of resonating when subjected to light of wavelength 1,750 to 2,000 nm as well as light of wavelength 455 nm. Then, light of wavelength 1,750 to 2,000 nm is used to reduce the energy level of the electrons from $^3F_4$ to $^3H_6$, while allowing the electrons to radiate energy. This reduces the lifetime of the energy level $^3F_4$.

With the above process, an inverted population is obtained between the energy levels $^3F_4$ and $^1D_2$. Consequently, blue laser light of wavelength 455 nm (a wavelength with high energy) is obtained.

Now, the principle of a process of obtaining blue laser lights of wavelengths 455 and 480 nm will be described with reference to FIG. 5.

Electrons in Tm3+, which have the base energy level $^3H_6$, absorb excitation light of wavelength 695 nm generated in the first $Pr^{3+}/Yb^{3+}$ doped optical fiber. Thus, the energy level of the electrons increases up to $^3F_2$ or $^3F_3$. The lifetimes of these levels are very short, and the electrons have their energy level decrease rapidly down to $^3H_4$. Then, the electrons further absorb excitation light of wavelength 635 nm generated in the second $Pr^{3+}/Yb^{3+}$ doped optical fiber. Thus, the energy level of the electrons increases up to $^1D_2$. As the electrons have their energy level decrease down to $^3F_4$, while radiating energy, blue light of wavelength 455 nm is emitted. The electrons, which have the energy level $^3F_4$, further absorb excitation light of wavelength 635 nm to have their energy level increase up to $^1G_4$. As the electrons have their energy level decrease from $^1G_4$ to $^3H_6$, while radiating energy, light of wavelength 480 nm is emitted.

Therefore, when an optical resonance function for lights of wavelengths 455 and 480 nm is provided to guide and emit the appropriate light, laser lights are obtained at wavelengths of 455 and 480 nm.

On the basis of the above principle, a fourth embodiment of the present invention will be described in detail with reference to the drawings.

Figure 6:
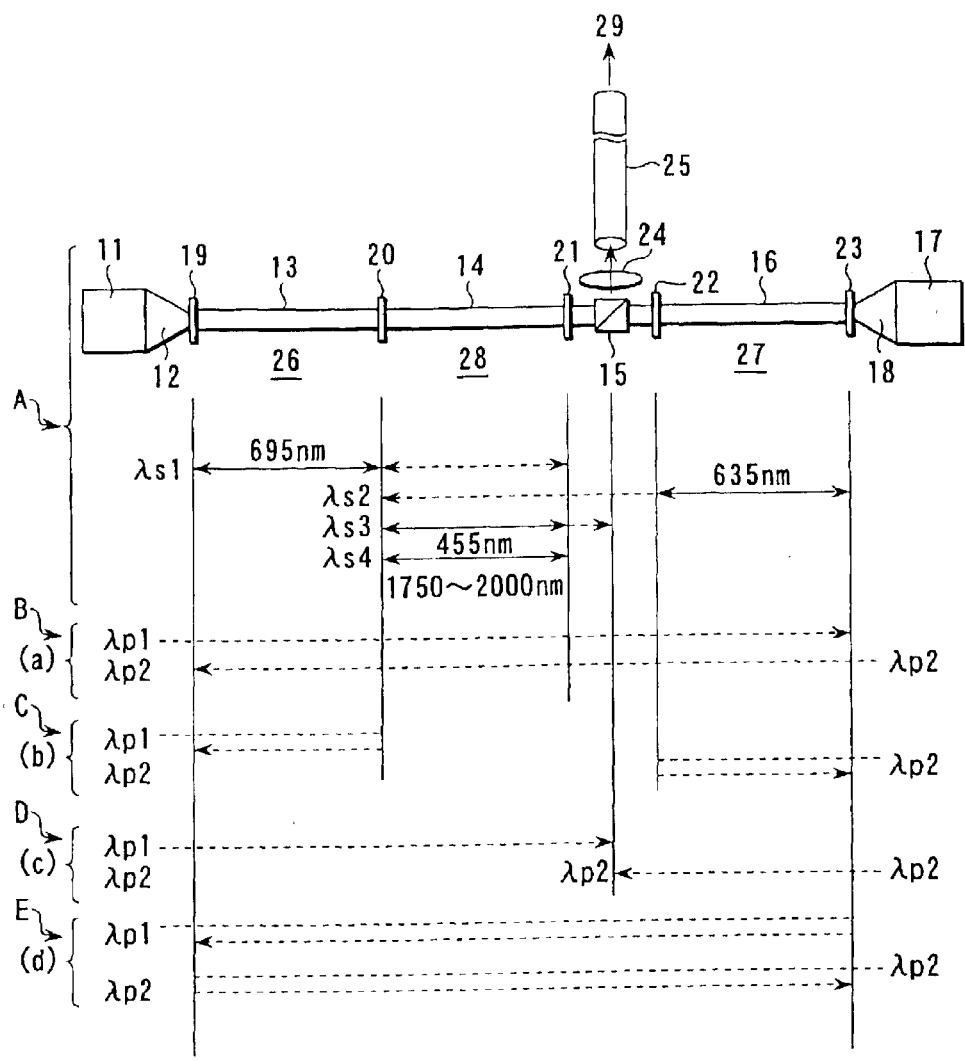
FIG. 6 is a diagram showing a system and used to describe a first embodiment of the fiber laser apparatus according to the present invention.

FIG. 6 is a diagram useful in describing another embodiment of the fiber laser apparatus of the present invention. First, the fourth embodiment will be described with reference to FIGS. 6A and 6B. Reference numeral 11 denotes a semiconductor laser which emits light of wavelength 820 to 1,000 nm (λp1) and which acts as first exciting means. Further, reference numeral 17 denotes a semiconductor laser which emits light of wavelength 820 to 1,000 nm ($\lambda$p2) and which acts as second exciting means. In the following description, reference characters $\lambda$p1 and $\lambda$p2 denote the wavelengths of lights emitted by the semiconductor lasers 11 and 17, respectively.

Consequently, the reflection elements 19 and 20 and the third optical fiber 13 form the optical resonator 26 for the wavelength $\lambda$s1 (695 nm).

A core portion of the optical fiber 13 is doped with both 100 to 10,000 ppm of $Pr^{3+}$ and 500 to 100,000 ppm of $Yb^{3+}$. Base material for the optical fiber 13 is material with low phonon energy such as halide glass material.

The reflection element 19 is characterized by allowing light of wavelength $\lambda$p1 to substantially totally pass therethrough, while substantially totally reflecting light of wavelength 695 nm ($\lambda$s1).

The reflection element 20 is characterized by allowing lights of wavelengths $\lambda$p1 and $\lambda$p2 to substantially totally pass therethrough, while partially reflecting light of wavelength $\lambda$s1 and substantially totally reflecting lights of wavelengths 1,750 to 2,000 nm ($\lambda$s4) and 635 nm ($\lambda$s2).

Therefore, the reflection element 19, the reflection element 20 and the third optical fiber 13 form an optical resonator 26 of 695 nm ($\lambda$s2).

A core portion of the optical fiber 16 is doped with both 100 to 10,000 ppm of $Pr^{3+}$ and 500 to 100,000 ppm of $Yb^{3+}$. Base material for the optical fiber 16 is material with low phonon energy such as halide glass material.

The reflection element 23 is characterized by allowing light of wavelength $\lambda$p2 to substantially totally pass therethrough, while substantially totally reflecting light of wavelength $\lambda$s2 (635 nm).

The reflection element 22 is characterized by allowing lights of wavelengths $\lambda$p1 and $\lambda$p2 to substantially totally pass therethrough, while partially reflecting light of wavelength $\lambda$s2 (635 nm). Consequently, the reflection elements 22 and 23 and the third optical fiber 13 form the optical resonator 27 for the wavelength $\lambda$s2 (635 nm).

A core portion of the $Tm^{3+}$ doped fiber 14, the first optical fiber, is doped with 100 to 10,000 ppm of $Tm^{3+}$. Base material for the optical fiber 16 is material with low phonon energy such as halide glass material.

The reflection element 21 is characterized by allowing lights of wavelengths $\lambda$p1 (820 to 1,000 nm), $\lambda$p2 (820 to 1,000 nm), and $\lambda$s2 (635 nm) to substantially totally pass therethrough, while substantially totally reflecting lights of wavelengths $\lambda$s1 (695 nm) and $\lambda$s4 (1,750 to 2,000 nm) and partially reflecting light of wavelength $\lambda$s3 (455 nm).

The reflection elements 20 and 21 and $Tm^{3+}$ doped optical fiber 14 form the optical resonator 28.

The optical fiber 13, the $Tm^{3+}$ doped optical fiber 14, and the optical fiber 16 are butt-joined together via the reflection elements 20 and 21 and the element 15 as a wavelength selection output means, and the reflection element 22.

The wavelength selection output means if an optical multi/demultiplexer, e.g. a WDM (Wavelength Division Multiplexing) coupler. The optical multi/demultiplexer 15 is characterized by allowing lights of wavelengths $\lambda$p1, $\lambda$p2, and $\lambda$s2 to substantially totally pass therethrough, while substantially totally reflecting light of wavelength $\lambda$s3, so that the input light of wavelength $\lambda$s3 is output upward (to the optical fiber 25).

Consequently, excitation light of wavelength $\lambda$s3, which is effective on $Tm^{3+}$, is efficiently incident on the core of the optical fiber 25.

Now, an operation will be described. Excitation light of wavelength 820 to 1,000 nm ($\lambda$p1) emitted by the semiconductor laser 11 is condensed by the condensing means 12, is subsequently transmitted through the reflection element 19, and is then incident on the core portion of the optical fiber 13. The appropriate selection of the core diameter or NA (Numerical Aperture) of the optical fiber provides optical power (optical density) of about 0.5 MW/cm$^2$. As described in the above principle, while the excitation light is propagating, electrons excite $Pr^{3+}$ and $Yb^{3+}$ in the optical fiber 13 to emit light.

However, the optical resonator 26 causes only light of wavelength 695 nm ($\lambda$s1) of the emitted light to be repeatedly reflected and amplified to cause laser oscillation. Part of the light is transmitted through the reflection element 20, a partially reflecting mirror, and is then incident on the optical fiber 14. Further, the remaining part of the light of wavelength $\lambda$p1 is reflected and returned.

On the other hand, light of wavelength 820 to 1,000 nm ($\lambda$p2) emitted by the semiconductor laser 17 is condensed by the condensing lens 18, is subsequently transmitted through the reflection element 23, and is then incident on the core portion of the optical fiber 16. As described in the above principle, while the excitation light is propagating, electrons excite $Pr^{3+}$ and $Yb^{3+}$ in the optical fiber 16 to emit light.

Then, the optical resonator 27 causes only light of wavelength 635 nm ($\lambda$s2) of the emitted light to be repeatedly reflected and amplified to cause laser oscillation. Part of the light is transmitted through the reflection element 22, a partially reflecting mirror, and is then incident on the optical fiber 14. Further, the remaining part of the light of wavelength $\lambda$p2 is reflected and returned.

The lights of wavelengths 695 nm ($\lambda$s1) and 820 to 1,000 nm ($\lambda$p1), transmitted through the reflection element 20, are incident on the core portion of the $Tm^{3+}$ doped optical fiber 14.

On the other hand, the lights of wavelengths 635 nm ($\lambda$s2) and 820 to 1,000 nm ($\lambda$p2), transmitted through the reflection element 22, are totally transmitted through the optical multi/demultiplexer 15 and then the reflection element 21 and are then incident on the core portion of the $Tm^{3+}$ doped optical fiber 14.

In the optical fiber 14, the incident lights of wavelengths 695 nm ($\lambda$s1) and 635 nm ($\lambda$s2) excite $Tm^{3+}$ to emit lights of wavelengths 455 nm ($\lambda$s3) and 1,750 to 2,000 nm ($\lambda$s4), as described in the above principle.

The optical resonator 28 causes light of wavelength 1,750 to 2,000 nm ($\lambda$s4) to be repeatedly reflected and amplified to cause laser oscillation. This oscillation yields an inverted population between energy levels at which light of wavelength 455 nm ($\lambda$s3) is emitted. The light of wavelength 455 nm ($\lambda$s3) is also repeatedly reflected and amplified to cause laser oscillation.

The laser light of wavelength 455 nm ($\lambda$s3) is partially transmitted through the reflection element 21, a partially reflecting mirror and is then incident on the optical multi/demultiplexer 15. Then, the element 15 outputs laser light of wavelength $\lambda$3 toward a joining element 24 at a large spread angle. This laser light is condensed by the joining element 24 so as to be incident on a facet of the multimode fiber 25.

The multimode fiber 25 has a large NA and a larger core diameter than the optical fiber 14. Accordingly, the multimode fiber 25, which receives laser light from the optical fiber 14, can be easily positioned so as to receive the laser light. That is, the multimode fiber 25 can efficiently receive laser light. Thus, a laser light output 29 of wavelength 455 nm ($\lambda$s3) is obtained from the other facet of the multimode fiber 25.

On the other hand, incident light of wavelength 820 to 1,000 nm ($\lambda$p1 and $\lambda$p2) has a wavelength band that does not interact with $Tm^{3+}$ and is thus transmitted through the fiber and output with no substantial losses.

The light of wavelength $\lambda$p1 is applied to the core part of the optical fiber 14, passing through the multi/demultiplexer 15 and the reflection element 22. The light of wavelength $\lambda$p1 can excite $Pr^{3+}$ and $YB^{3+}$ contained in the optical fiber 14, too. It is therefore absorbed and effectively utilized.

Similarly, the light of wavelength $\lambda$p2 is applied to the core part of the optical fiber 13, passing through the reflection element 22. The light of wavelength $\lambda$p2 can excite $Pr^{3+}$ and $YB^{3+}$ contained in the optical fiber 13, too. It is therefore absorbed and effectively utilized.

That is, excitation light of wavelength $\lambda$p1 emitted by the semiconductor laser 11 and excitation light of wavelength $\lambda$p2 emitted by the semiconductor laser 17 propagate as shown by the dotted arrows shown at B in FIG. 6. As a result, the optical power (optical density) in the first and second optical fibers 13 and 16 is equal to the sum of optical power of lights of wavelengths $\lambda$p1 and $\lambda$p2. Therefore, the optical power is improved.

As described above, blue light is obtained using the simply configured fiber laser apparatus.

The condensing elements 12 and 18 may be, for example, lens optical systems or optical waveguides. The reflection elements 19, 20, 21, 22, and 23 may be dielectric multilayer films formed directly on the facet of the optical fiber. Further, similar effects are produced with fiber Bragg gratings (FBG).

In this embodiment, the optical fibers 13, 14, and 16 are butt-joined together via the reflection elements. However, the present invention is not limited to this aspect but the reflection element may be divided so that pieces thereof obtained may be connected or joined together using another optical fiber, optical system, or optical waveguide. Further, in this embodiment, the optical multi/demultiplexer 15 is provided between the optical resonator 27, which emit light of wavelength 635 nm ($\lambda$s2), and the optical resonator 28. However, similar effects are produced by dividing the reflection element 20 so that the optical multi/demultiplexer 15 can be provided between the optical resonators 26 and 28. That is, in the above description, the wavelength $\lambda$s1 may be replaced with the wavelength 635 nm, and the wavelength $\lambda$s2 may be replaced with the wavelength 695 nm.

Figure 5:
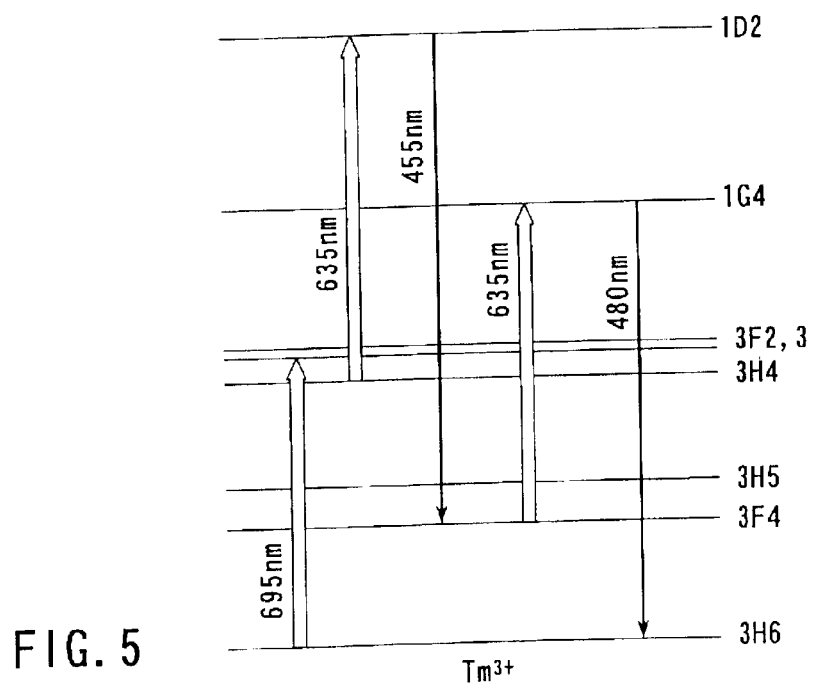
FIG. 5 is a diagram showing energy levels and used to describe the principle of a process of obtaining a blue laser beam.

Further, the configuration of the reflection elements described in FIG. 5, showing the principle, may be used to obtain lights of wavelengths 455 and 480 nm.

An apparatus configured as shown at A in FIG. 6 and operating as shown at C in FIG. 6 constitutes a fifth embodiment. This configuration is obtained by changing the characteristics of the reflection element 20 so that the element 20 substantially totally reflects light of wavelength $\lambda$p1, compared to the case of the operation shown at B in FIG. 6. Further, the characteristics of the reflection element 22 are changed so that the reflection element 22 substantially totally reflects light of wavelength $\lambda$p2.

This change allows an increase in optical power equivalent to that achieved by the configuration shown at A and B in FIG. 6 because excitation lights of wavelengths $\lambda$p1 and $\lambda$p2 reciprocate through the optical fibers 13 and 14.

An apparatus configured as shown at A in FIG. 6 and operating as shown at D in FIG. 6 constitutes a sixth embodiment. This configuration is obtained by changing the characteristics of the optical multi/demultiplexer 15 compared to the case of the operation shown at B in FIG. 6. The optical multi/demultiplexer 15 is changed so as to substantially totally reflect lights of wavelengths $\lambda$p1 and $\lambda$p2 incident thereon from lateral directions so that light of wavelength $\lambda$1 propagates toward the optical fiber 25, while light of wavelength $\lambda$2 propagates away from the optical fiber 25.

This configuration prevents unstable operation of the semiconductor laser which may be caused by incidence of light of wavelength $\lambda$p1 on the semiconductor 17 or incidence of light of wavelength $\lambda$p2 on the semiconductor 11. In this case, lights of wavelengths $\lambda$p1 and $\lambda$p2 are mixed into output light of wavelength 455 nm ($\lambda$p3). However, the mixed lights can be easily filtered by adding an optical filter (not shown) to the output side, the filer being characterized to allow only light of wavelength $\lambda$p3 to pass therethrough, while blocking lights of wavelengths $\lambda$p1 and $\lambda$p2.

An apparatus configured as shown at A in FIG. 6 and operating as shown at E in FIG. 6 constitutes a seventh embodiment. This apparatus is of a type in which lights of oscillation wavelengths $\lambda$p1 and $\lambda$p2 are obtained from the different semiconductor lasers 11 and 17 compared to the case of the operation shown at B in FIG. 6. The reflection element 19 has its characteristics changed so as to allow light of wavelength $\lambda$p1 to substantially totally pass therethrough, while substantially totally reflecting light of wavelength $\lambda$p2. The reflection element 23 has its characteristics changed so as to substantially totally reflect light of wavelength $\lambda$p1, while allowing light of wavelength $\lambda$p2 to substantially totally pass therethrough.

This configuration improves optical power because lights of wavelengths $\lambda$p1 and $\lambda$p2 reciprocate through the optical fibers 13 and 16.

Figure 7:
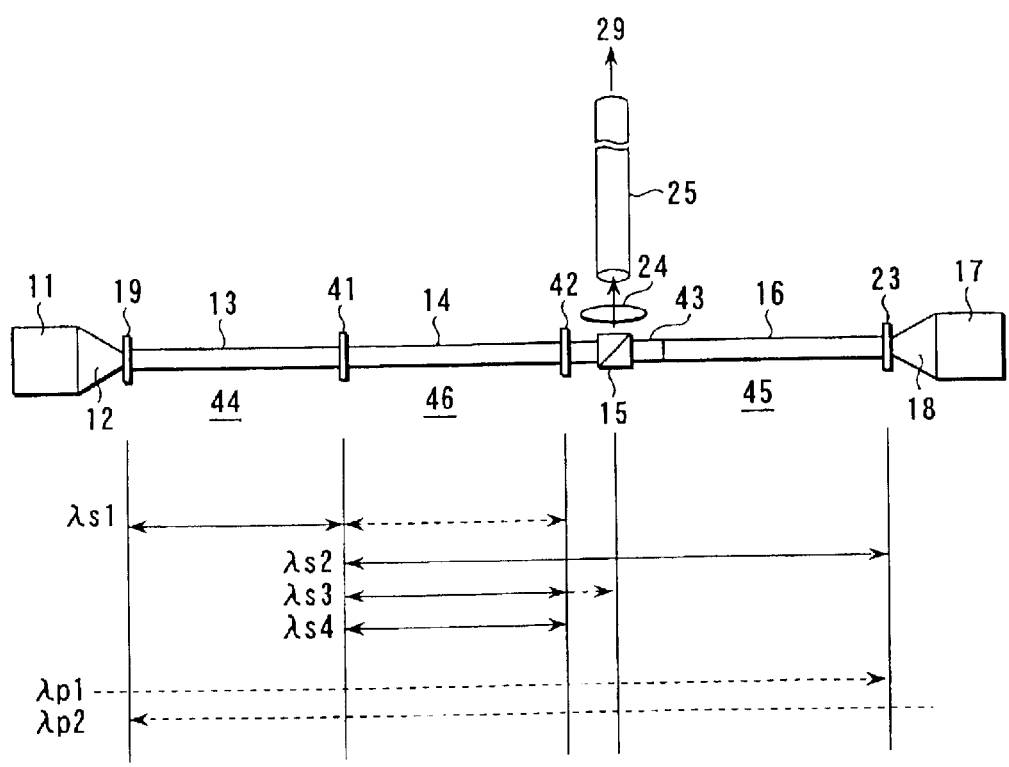
FIG. 7 is a diagram showing a system and used to describe a second embodiment of the fiber laser apparatus according to the present invention.

FIG. 7 shows another embodiment of the present invention. In the following description, the same functions as those in FIG. 6 are denoted by the same reference numerals.

A reflection element 41 provided between a right end of the third optical fiber 13 and a left end of the $Tm^{3+}$ doped optical fiber 14 is characterized to allow lights of wavelengths $\lambda$p1, $\lambda$p2, and $\lambda$s1 to substantially totally pass therethrough, while substantially totally reflecting lights of wavelengths $\lambda$s2, $\lambda$s3, and $\lambda$s4. Further, a reflection element 42 provided between a right end of the $Tm^{3+}$ doped optical fiber 14 and a left end of the optical multi/demultiplexer 15 is characterized to allow lights of wavelengths $\lambda$p1, $\lambda$p2, and $\lambda$s2 to substantially totally pass therethrough, while substantially totally reflecting lights of wavelengths $\lambda$s1 and $\lambda$s4 and partially reflecting light of wavelength $\lambda$s3. A right end of the optical multi/demultiplexer 15 and a left facet 43 of the first optical fiber 14 are butt-joined together without any reflection elements.

The reflection elements 19 and 42, and the third optical fiber 13, reflection element 41, and $Tm^{3+}$ doped optical fiber 14, provided between the reflection elements 19 and 42, form an optical resonator 44 including the optical fiber 14.

Further, the reflection elements 23 and 41, and the first optical fiber 14, facet 43, optical multi/demultiplexer 15, reflection element 42, and $Tm^{3+}$ doped optical fiber 14, provided between the reflection elements 23 and 42, form an optical resonator 45 including the optical fiber 14. Furthermore, the reflection elements 41 and 42 and the $Tm^{3+}$ doped optical fiber 14 form an optical resonator 46.

Subsequently, the operation of the fiber laser apparatus in FIG. 7 will be described. Excitation light of wavelength 820 to 1,000 nm ($\lambda$p1) emitted by the semiconductor laser 11 is condensed by the condensing lens 12, is subsequently transmitted through the reflection element 19, and is then incident on the core portion of the third optical fiber 13. As described in the above principle, while the excitation light is propagating, electrons excite $Pr^{3+}$ and $Yb^{3+}$ in the third optical fiber 13 to emit light. Then, the optical resonator 44 causes light of wavelength 695 nm (a wavelength with high energy) emitted by excited $Pr^{3+}$ to be repeatedly reflected and amplified between the reflection elements 19 and 42 to cause laser oscillation.

The optical resonator 44 contains the $Tm^{3+}$ doped optical fiber 14. Thus, $Tm^{3+}$ can be efficiently excited without causing the resonator 44 to output light of wavelength $\lambda s1$. Further, the remaining part of the excitation light of wavelength $\lambda p1$ is transmitted through the reflection element 42 and output rightward. This part is then transmitted through the optical multi/demultiplexer 15 rightward and is then incident on the core portion of the first optical fiber 14 through the facet 43. The light is then effectively used to excite $Pr^{3+}/Yb^{3+}$ in the first optical fiber 14.

On the other hand, excitation light of wavelength 820 to 1,000 nm ($\lambda p2$) emitted by the semiconductor laser 17 is condensed by the condensing lens 18, is subsequently transmitted through the reflection element 23, and is then incident on the core portion of the third optical fiber 14. As described in the above principle, while the excitation light is propagating, electrons excite $Pr^{3+}$ and $Yb^{3+}$ in the first optical fiber 14 to emit light. Then, the optical resonator 45 causes light of wavelength 635 nm (a wavelength with high energy) emitted by excited $Pr^{3+}$ to be repeatedly reflected and amplified between the reflection elements 23 and 41 to cause laser oscillation.

The optical resonator 45 contains the $Tm^{3+}$ doped optical fiber 14. Thus, $Tm^{3+}$ can be efficiently excited without causing the resonator 45 to output light of wavelength $\lambda s2$. Further, the remaining part of the excitation light of wavelength $\lambda p2$ is transmitted through the reflection element 41 and is then incident on the core portion of the third optical fiber 13. The light is then effectively used to excite $Pr^{3+}/Yb^{3+}$ in the third optical fiber 13.

The optical resonator 48 causes the thus excited $Tm^{3+}$ doped optical fiber 14 to oscillate lights of wavelengths 1,750 to 2,000 nm ($\lambda s4$) and 455 nm (a wavelength with high energy). The oscillated light of wavelength $\lambda s3$ is partially taken out by the reflection element 42, a partially reflecting mirror, and is then output by the optical multi/demultiplexer 15 at a large spread angle in the upper part of FIG. 7. Then, the output light is incident on the facet of the multimode fiber 25 via the joining element 24. The multimode fiber 25 has a large NA and a larger core diameter than the optical fiber 14. Accordingly, the multimode fiber 25 can be easily positioned so that light from the optical multi/demultiplexer 15 can be efficiently incident on the multimode fiber 25.

Thus, the blue laser light output 29 of wavelength 455 nm ($\lambda s3$) is obtained from the other facet of the multimode fiber 25.

The reflection elements 19, 41, 42, and 23 may be dielectric multilayer films formed directly on the facet of the optical fiber. Further, similar effects are produced with fiber Bragg gratings (FBG).

In this embodiment, the optical fibers 13, 14, and 16 are butt-joined together via the reflection elements. However, the present invention is not limited to this aspect, but the reflection element may be divided so that pieces thereof obtained may be connected or joined together using another optical fiber, optical system, or optical waveguide. Further, in this embodiment, the optical multi/demultiplexer 15 is provided in the optical resonator 45, which emits light of wavelength 635 nm (a wavelength with high energy) ($\lambda s2$). However, similar effects are produced by providing the reflection element 15 between reflection element 41 and the third optical fiber 13. That is, in the above description, the wavelength $\lambda s1$ may be replaced with the wavelength 635 nm, and the wavelength $\lambda s2$ may be replaced with the wavelength 695 nm. Alternatively, the optical fiber 14 may be included in only one of the optical resonators 44 and 45.

Further, in the above description, excitation lights emitted by the semiconductor lasers 11 and 17 are used by the arrangement corresponding to A and B in FIG. 6. The arrangement and operation corresponding to C, D, or E may also be obtained. In this case, the reflection characteristics of the reflection elements must be properly changed.

Now, yet another embodiment of the fiber laser apparatus of the present invention will be described with reference to the schematic diagram in FIG. 8. In the following description, the same functional sections as those in FIG. 6 are denoted by the same reference numerals.

Figure 8:
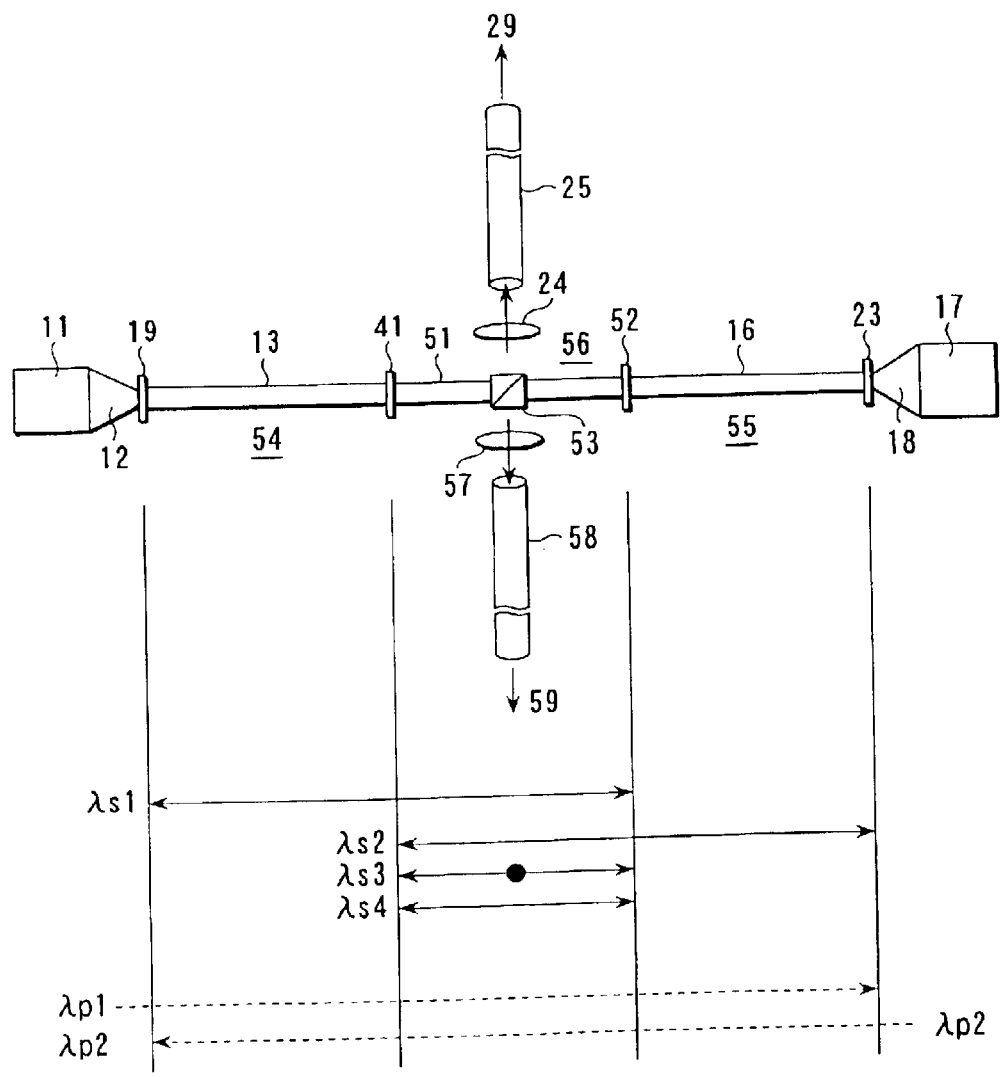
FIG. 8 is a diagram showing a system and used to described a third embodiment of the fiber laser apparatus according to the present invention.

In FIG. 8, a core portion of a $Tm^{3+}$ doped fiber 51 is doped with 100 to 10,000 ppm of $Tm^{3+}$. Base material for the optical fiber 16 is material with low phonon energy such as halide glass material. A reflection element 52 is characterized by allowing lights of wavelengths $\lambda p1$, $\lambda p2$, and $\lambda s2$ to substantially totally pass therethrough, while substantially totally reflecting lights of wavelengths $\lambda s1$, $\lambda s3$, and $\lambda s4$. Further, a reflection element 53 in the $Tm^{3+}$ doped optical fiber 51, which acts as wavelength selection output means, is characterized by allowing lights of wavelengths $\lambda p1$, $\lambda p2$, $\lambda s1$, $\lambda s2$, and $\lambda s4$ to substantially totally pass therethrough, while partially reflecting and outputting light of wavelength $\lambda s3$ in a vertical direction.

The optical fiber 13, the $Tm^{3+}$ doped optical fiber 51, and the first optical fiber 14 are butt-joined together via the reflection elements. The reflection elements 19 and 52, and the optical fiber 13, reflection elements 41, and reflection-element-53-containing $Tm^{+3}$ doped optical fiber 51, provided between the reflection elements 19 and 52, form an optical resonator 54 including the optical fiber 51. The reflection elements 23 and 41, and the first optical fiber 14, reflection element 52, and reflection-element-53-containing $Tm^{3+}$ doped optical fiber 51, provided between the reflection elements 23 and 41, form an optical resonator 55 including the optical fiber 51. The reflection elements 41 and 52, and the reflection-element-53-containing $Tm^{3+}$ doped optical fiber 51, provided between the reflection elements 41 and 52, form an optical resonator 56.

Subsequently, the operation of the optical fiber apparatus in FIG. 8 will be described.

Excitation light of wavelength 820 to 1,000 nm ($\lambda p1$) emitted by the semiconductor laser 11 is condensed by the condensing lens 12, is subsequently transmitted through the reflection element 19, and is then incident on the core portion of the third optical fiber 13. As described in the above principle, while the excitation light is propagating, electrons excite $Pr^{3+}$ and $Yb^{3+}$ in the third optical fiber 13 to emit light. Then, the optical resonator 54 causes light of wavelength 695 nm ($\lambda s1$) emitted by excited $Pr^{3+}$ to be repeatedly reflected and amplified between the reflection elements 19 and 52, between which the $Tm^{3+}$ doped optical fiber 51 is provided, to cause laser oscillation.

The optical resonator 54 contains the $Tm^{3+}$ doped optical fiber 51. Thus, $Tm^{3+}$ can be efficiently excited without causing the resonator 54 to output light of wavelength $\lambda s1$.

Further, the remaining part of the excitation light of wavelength λp1 is transmitted through the reflection element 52 and is then incident on the core portion of the first optical fiber 14. The light is then effectively used to excite $Pr^{3+}/Yb^{3+}$ in the first optical fiber 14.

On the other hand, excitation light of wavelength 820 to 1,000 nm (λp2) emitted by the semiconductor laser 17 is condensed by the condensing lens 18, is subsequently transmitted through the reflection element 23, and is then incident on the core portion of the third optical fiber 14. As described in the above principle, while the excitation light is propagating, electrons excite $Pr^{3+}$ and $Yb^{3+}$ in the first optical fiber 14. Then, the optical resonator 55 causes light of wavelength 635 nm (λs2) emitted by excited $Pr^{3+}$ to be repeatedly reflected and amplified between the reflection elements 23 and 41, between which the $Tm^{3+}$ doped optical fiber 51 is provided, to cause laser oscillation.

The optical resonator 55 contains the $Tm^{3+}$ doped optical fiber 51. Thus, $Tm^{3+}$ can be efficiently excited without causing the resonator 55 to output light of wavelength λs2. Further, the remaining part of the excitation light of wavelength λp2 is transmitted through the reflection element 41 and is then incident on the core portion of the third optical fiber 13. The light is then effectively used to excite $Pr^{3+}/Yb^{3+}$ in the third optical fiber 13.

The optical resonator 56 causes the thus excited $Tm^{3+}$ doped optical fiber 51 to oscillate lights of wavelengths 1,750 to 2,000 nm (λs4) and 455 nm (λs3). The oscillated light of wavelength λs3 is partially taken out by the reflection element 53, a partially reflecting mirror, and is then output upward and downward. Then, the light output upward is incident on the facet of the multimode fiber 25 via the joining element 24. The multimode fiber 25 has a large NA and a larger core diameter than the optical fiber 51. Accordingly, the multimode fiber 25 can be easily positioned so that light from the optical multi/demultiplexer 15 can be efficiently incident on the multimode fiber 25.

Thus, the laser light output 29 of wavelength 455 nm (λs3) is obtained from the other facet of the multimode fiber 25. Likewise, the light output downward is incident on a facet of a multimode fiber 58 via a joining element 57. The multimode fiber 58 has a large NA and a larger core diameter than the optical fiber 51. Accordingly, the multimode fiber 25 can be easily positioned so that light from the optical multi/demultiplexer 15 can be efficiently incident on the multimode fiber 25.

Thus, a blue laser light output 59 of wavelength 455 nm (λs3) is obtained from the other facet of the multimode fiber 58.

The reflection elements 19, 41, 52, and 23 may be dielectric multilayer films formed directly on the facet of the optical fiber. Further, similar effects are produced with fiber Bragg gratings (FBG). In this embodiment, the optical fibers 13, 51, and 16 are butt-joined together via the reflection elements. However, the present invention is not limited to this aspect, but the reflection element may be divided so that pieces thereof obtained may be connected or joined together using another optical fiber, optical system, or optical waveguide.

Furthermore, in the above description, excitation lights emitted by the semiconductor lasers 11 and 17 are used by the arrangement corresponding to A and B in FIG. 6. The arrangement and operation corresponding to C, D, or E may also be implemented. In this case, the reflection characteristics of the reflection elements must be properly changed. It is also possible to remove the optical fiber 51 from the optical resonator 55.

Description will be given of an embodiment of an optical multi/demultiplexer for used in the fiber laser apparatus of the present invention.

Figure 9:
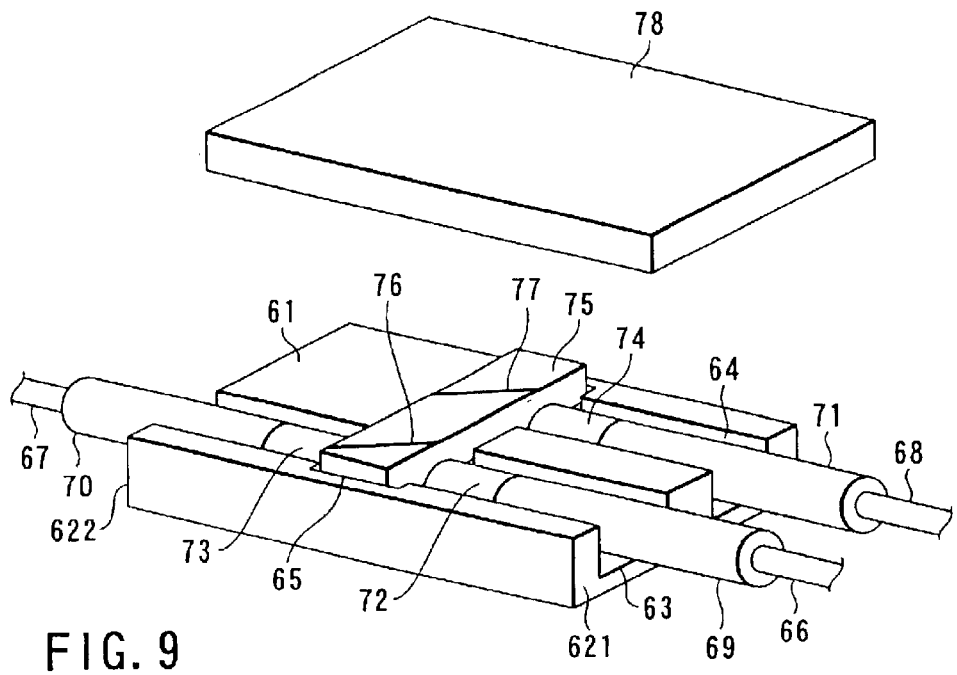
FIG. 9 is a perspective view useful in describing a first embodiment of an optical multi/demultiplexer used for the fiber laser apparatus according to the present invention.
Figure 10:
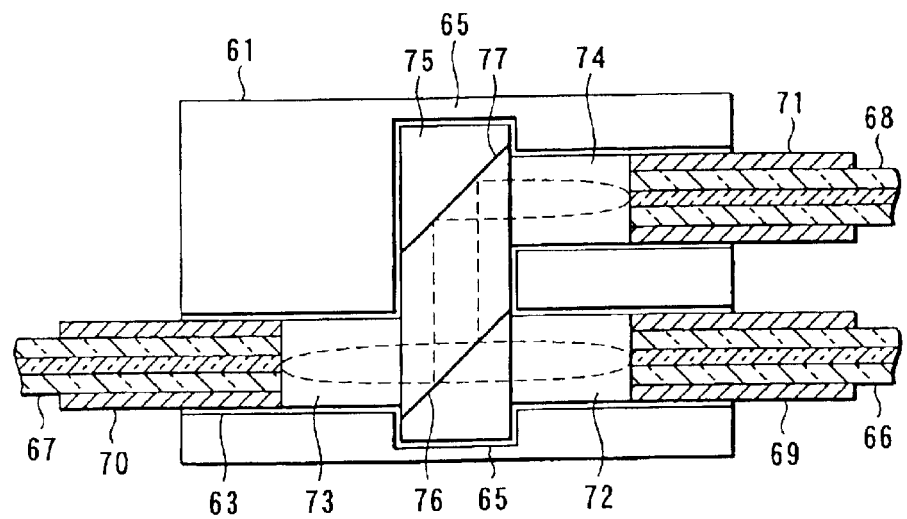
FIG. 10 is a sectional view of the configuration shown in FIG. 9.

FIG. 9 is a perspective view useful in describing a first embodiment of an optical multi/demultiplexer for use in the fiber laser apparatus of the present invention. FIG. 10 is a sectional view of the first embodiment.

In FIG. 9, reference numeral 61 denotes a substrate. The substrate has a linear groove 63 formed therein to extend from one side 621 to the other side 622 thereof and a linear groove 64 formed therein to extend from the side 621 to an intermediate position thereof. The grooves 63 and 64 have a recess 65 formed therein to cross at right angles thereto.

Reference numerals 66 to 68 denote optical fibers. The optical fiber 68 has a larger core diameter than the optical fibers 66 and 67. Reference numerals 69 to 71 denote ferules through which the optical fibers 66 to 68 are inserted. The ferule 69 is fitted in the groove 63 located closer to the side 621. The ferule 70 is fitted in the groove 63 located closer to the side 622. The ferules 69 and 70 are located so that core facets of the optical fibers 66 and 67 are opposite to each other. The ferule 71 is fitted in the groove 64.

The ferules 69 to 71 have rod lenses 72 to 74 located at open ends thereof. A prism 75 is fitted in the recess 65. The ferules 69 to 71 have an outer diameter equal to that of the rod lenses 72 to 74. The prism 75 integrally holds mirrors 76 and 77. One surface of the mirror 76 is arranged obliquely opposite the rod lens 72. The other surface of the mirror 76 is arranged obliquely opposite the rod lens 73 as an optical I/O section. The mirror 77 is arranged obliquely opposite the rod lens 74. Reference numeral 78 denotes a cover.

Now, the operation of this optical multi/demultiplexer with reference to FIG. 10, a plan view in which the cover 78 has been removed.

Light emitted by the optical fiber 66 is converted into parallel light by the rod lens 72. The parallel light is transmitted through the mirror 76 and then condensed by the rod lens 73 so as to be incident on the optical fiber 67. On the other hand, light emitted by the optical fiber 67 is converted into parallel light by the rod lens 73. The parallel light is reflected by the mirrors 76 and 77 and then condensed by the rod lens 74 so as to be incident on the optical fiber 68. That is, the mirror 76 is set to allow light of a certain wavelength exiting the optical fiber 66 to pass therethrough, while reflecting light of a certain wavelength exiting the optical fiber 67. The mirror 77 is set to reflect light of a certain wavelength exiting the optical fiber 67.

Figure 11A:
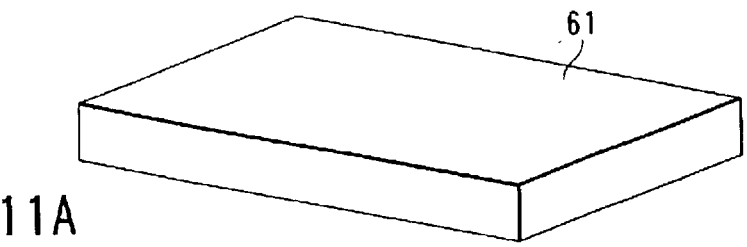
FIGS. 11A, 11B and 11C are diagrams useful in describing a method of manufacturing an essential part of the configuration shown in FIG. 9.
Figure 11B:
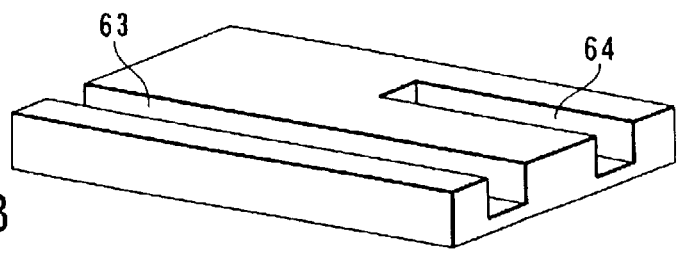
Figure 11C:
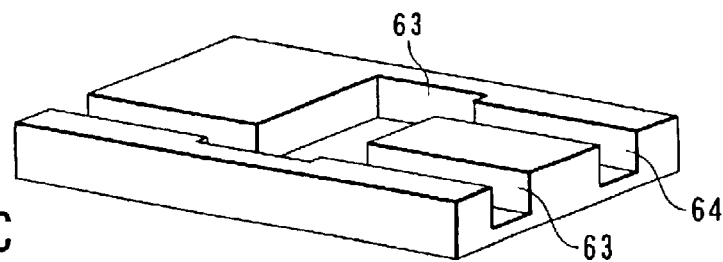

FIGS. 11A, 11B and 11C are diagrams showing the steps of manufacturing the substrate 61. First, the grooves 63 and 64, in which the optical fibers and the rod lenses are fitted in FIG. 11B, are formed in the substrate in FIG. 11A by cutting. Then, in FIG. 11C, the recess 65 is formed, in which the prism 75 is fitted.

Next, a method of assembling components in the substrate 61, formed by the steps in FIGS. 11A to 11C. First, the prism 75 is fitted in the recess 65. Then, the rod lenses 72 to 74 are fitted so that one end of each lens is bonded to the prism 75. Then, the optical fiber 66, inserted into the ferule 69, is fitted in the groove 63 so as to be bonded to the other end of the rod lens 72. The optical fiber 67, inserted into the ferule 70, is fitted in the groove 63 so as to be bonded to the other end of the rod lens 73. The optical fiber 68, inserted into the ferule 71, is fitted in the groove 64 so as to be bonded to the other end of the rod lens 74.

With the components bonded to one another, the components fitted in the grooves 63 and 64 and recess 65 are fixed with adhesive as they are. Then, the cover 78 is set to complete the assembly operation.

The optical fibers 66 and 67 are aligned with each other through the coaxial groove 63. Thus, the positional deviation between these fibers is small. Further, light exiting the optical fiber 66 is transmitted through the mirror. Thus, the positional deviation of the mirror 76 does not cause substantial optical coupling losses. This serves to reduce losses in the optical coupling of the optical fiber 66 to the optical fiber 67. The optical fibers 67 and 68 are not coaxially arranged, and the mirror 76 and 77 reflect light. Accordingly, the positions of the mirrors markedly affect the position of light incident on the optical fiber 68. However, since the optical fiber 68 has a larger core diameter than the optical fiber 67, the positional deviation between the mirrors 76 and 77 can be absorbed. This serves to reduce losses in the optical coupling of the optical fiber 67 to the optical fiber 68.

Moreover, the grooves 63 and 64, formed on the substrate 61, need not be rectangular as shown in FIGS. 11A to 11C but may be V- or U-shaped. The grooves 63 and 64 may be formed not only in the substrate 61 but also in the cover 78. The ferules 69 to 71 may be omitted, and the optical fibers may have an outer diameter equal to that of the rod lenses.

Figure 12:
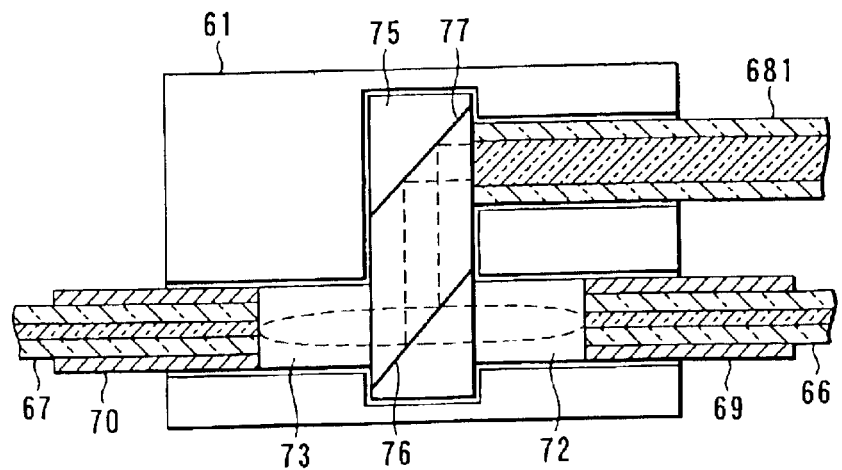
FIG. 12 is a sectional view useful in describing a first variation of the optical multi/demultiplexer shown in FIG. 9.
Figure 13:
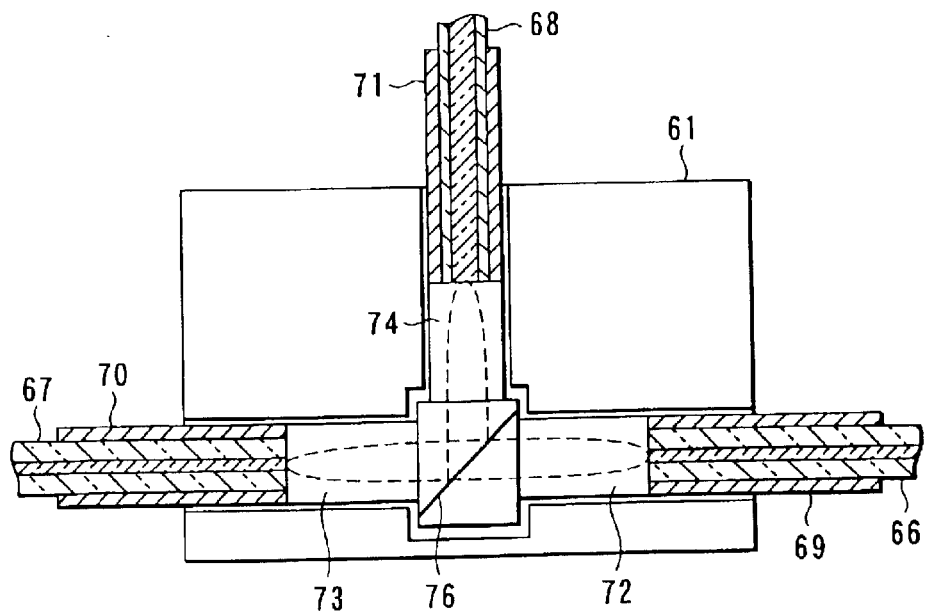
FIG. 13 is a sectional view useful in describing a second variation of the optical multi/demultiplexer shown in FIG. 9.
Figure 14:
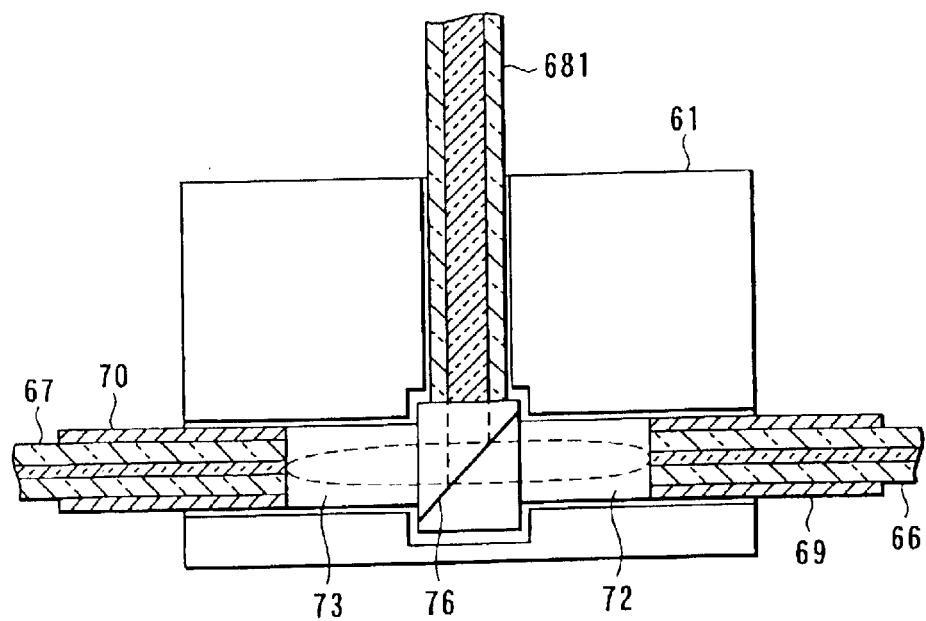
FIG. 14 is a sectional view useful in describing a third variation of the optical multi/demultiplexer shown in FIG. 9.

FIGS. 12 to 14 show variations of the optical multi/demultiplexer in FIG. 9. FIGS. 12 to 14 are sectional views useful in describing a first, second, and third variations, respectively. In the following description, the same functional sections as those in FIG. 9 are denoted by the same reference numbers.

In the optical multi/demultiplexer in FIG. 12, an optical fiber 681 has an increased core diameter, and the rod lens 74 is correspondingly omitted, compared to the optical multi/demultiplexer in FIG. 9. In this optical multi/demultiplexer, light reflected by the mirrors 76 and 77 is directly incident on the optical fiber 68 as parallel light.

In the optical multi/demultiplexer in FIG. 13, the optical fiber 68 is arranged perpendicularly to the optical fibers 66 and 67. Light reflected by the mirror 76 is condensed by the rod lens 74 so as to be incident on the optical fiber 68. In this case, the mirror 77 is not required.

In the optical multi/demultiplexer in FIG. 14, the optical fiber 681 has a larger core diameter than that of the optical multi/demultiplexer in FIG. 13. Light reflected by the mirror 76 is directly incident on the optical fiber 681 as parallel light. In this case, the mirror 74 is not required.

In this embodiment, an optical multi/demultiplexer for use in the fiber laser apparatus in FIG. 8 can be implemented by, for example, mounting another optical fiber in the substrate 61 so as to rest opposite the optical fiber 68 in FIG. 13.

Figure 15:
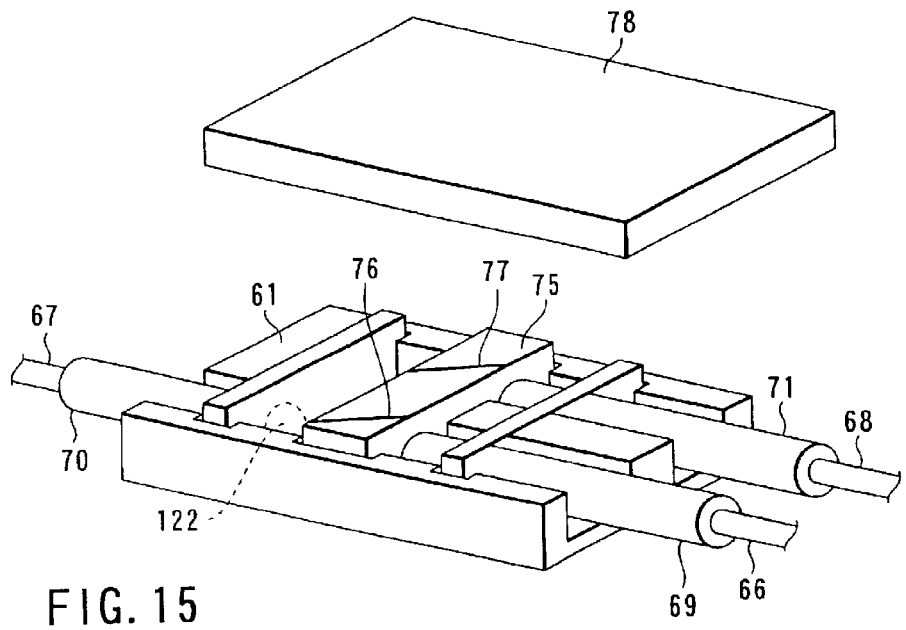
FIG. 15 is perspective view useful in describing a second embodiment of the optical multi/demultiplexer according to the present invention.
Figure 16:
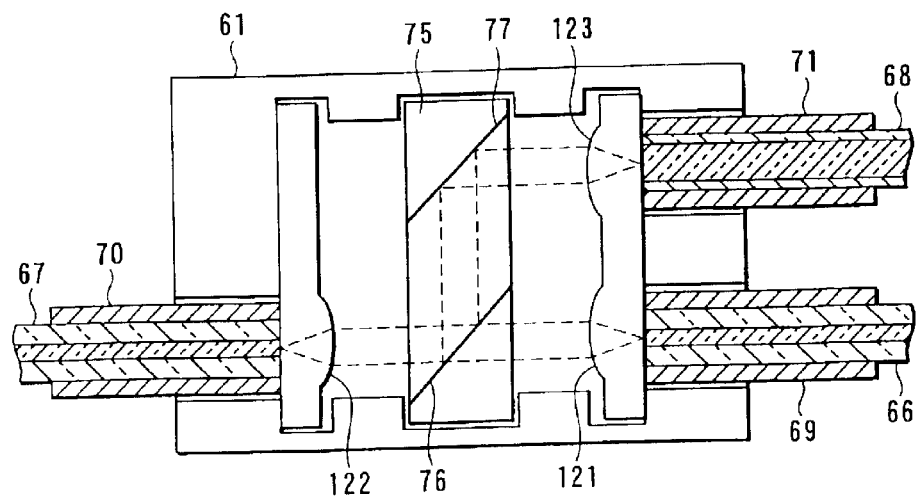
FIG. 16 is a sectional view of the configuration shown in FIG. 15.

FIG. 15 is a perspective view useful in describing a second embodiment of the optical multi/demultiplexer of the present invention. FIG. 16 is a sectional view of the second embodiment. In the following description, the same functional sections as those in FIG. 9 are denoted by the same reference numerals. This embodiment differs from the embodiment in FIG. 9 in that convex lenses are used in place of the rod lenses 72 to 74. A convex lens 121 corresponds to the rod lens 72. A convex lens 122 corresponds to the rod lens 73. A convex lens 123 corresponds to the rod lens 74. The optical operation of this optical multi/demultiplexer is similar to that in FIG. 9, and description thereof is thus omitted.

Figure 17:
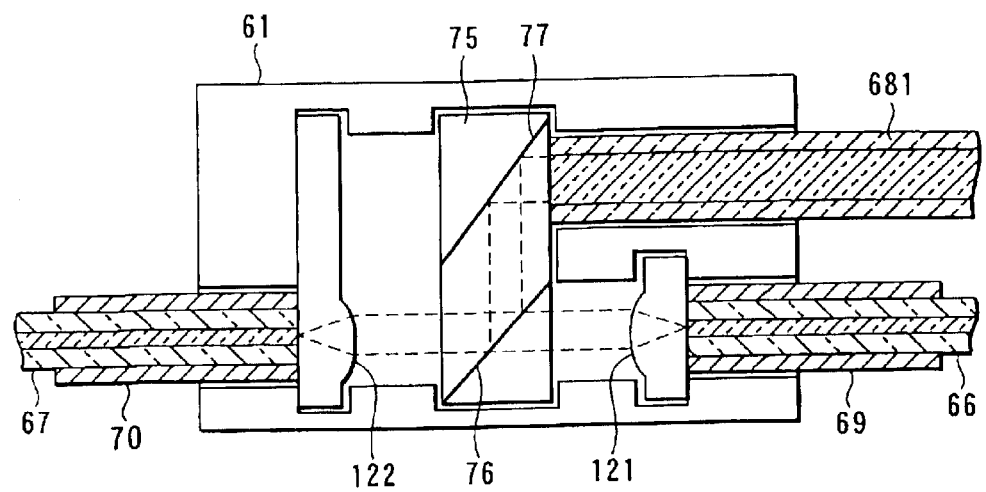
FIG. 17 is a sectional view useful in describing a first variation of the optical multi/demultiplexer shown in FIG. 15.
Figure 18:
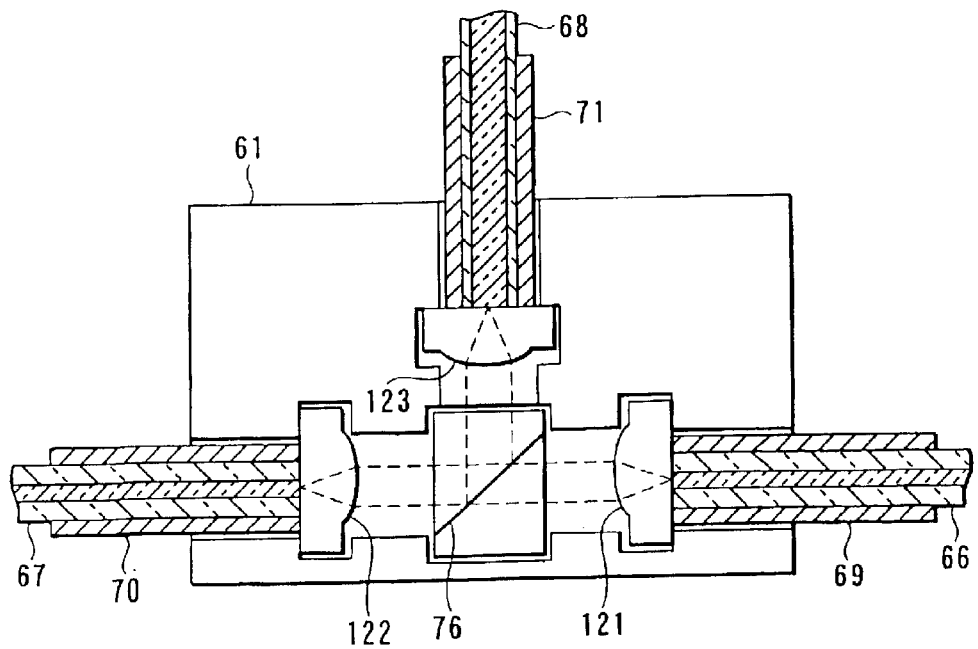
FIG. 18 is a sectional view useful in describing a second variation of the optical multi/demultiplexer shown in FIG. 15.
Figure 19:
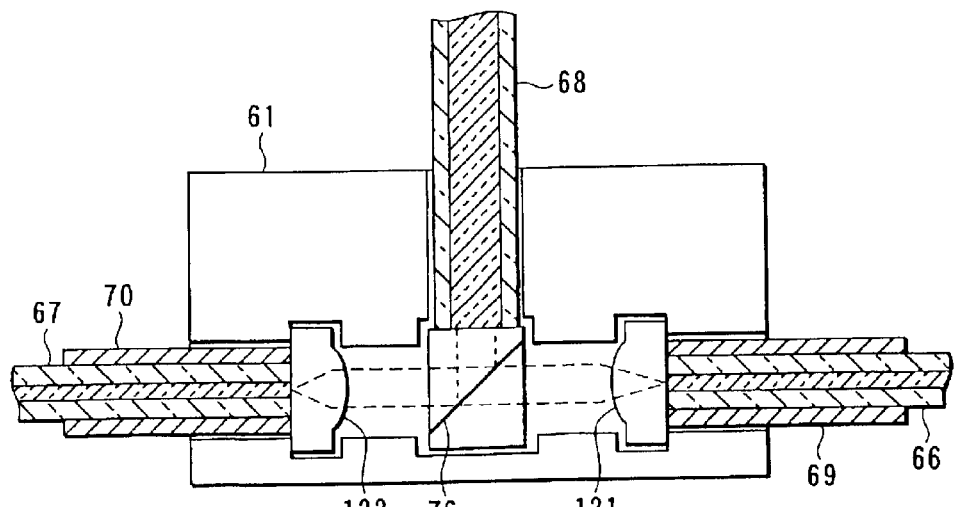
FIG. 19 is a sectional view useful in describing a third variation of the optical multi/demultiplexer shown in FIG. 15.

FIGS. 17 to 19 show variations of the optical multi/demultiplexer in FIG. 15. FIGS. 17 to 19 are sectional views useful in describing a first, second, and third variations, respectively. In the following description, the same functional sections as those in FIG. 9 are denoted by the same reference numbers.

The example in FIG. 17 differs from the example in FIG. 12 in that convex lenses 121 and 122 are used in place of the rod lenses 72 and 73, respectively, shown in FIG. 12. The optical operation of this optical multi/demultiplexer is similar to that in FIG. 12, and description thereof is thus omitted.

Furthermore, in the example in FIG. 18, the convex lenses 121 and 122 are used in place of the rod lenses 72 and 73, respectively, shown in FIG. 13.

In the example in FIG. 19, the convex lenses 121 and 122 are used in place of the rod lenses 72 and 73, respectively, shown in FIG. 14. The optical operations of the optical multi/demultiplexers in FIGS. 18 and 19 are each similar to that in FIG. 12, and description thereof is thus omitted.

Figure 20:
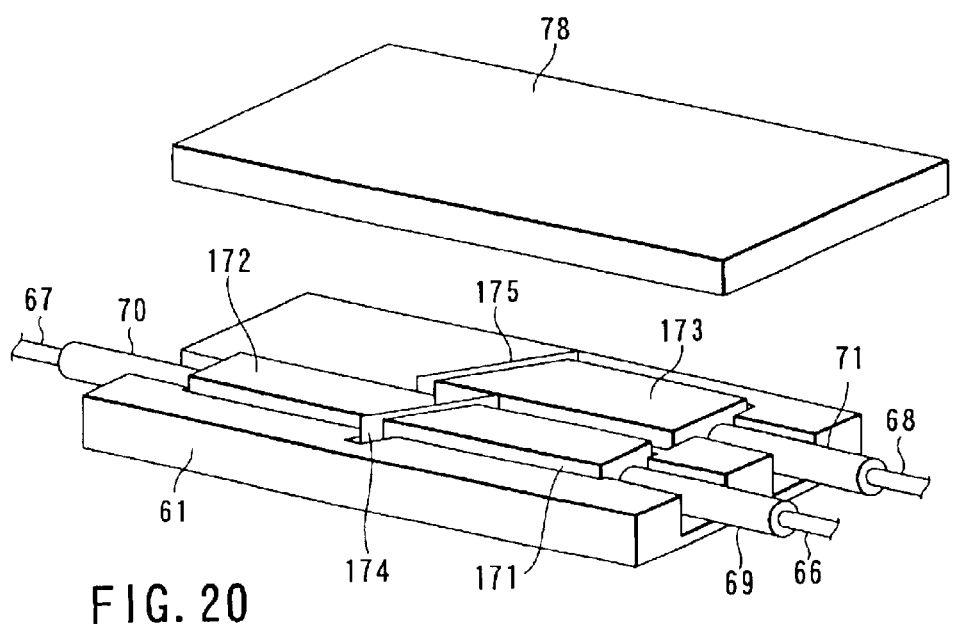
FIG. 20 is perspective view useful in describing a third embodiment of the optical multi/demultiplexer according to the present invention.
Figure 21:
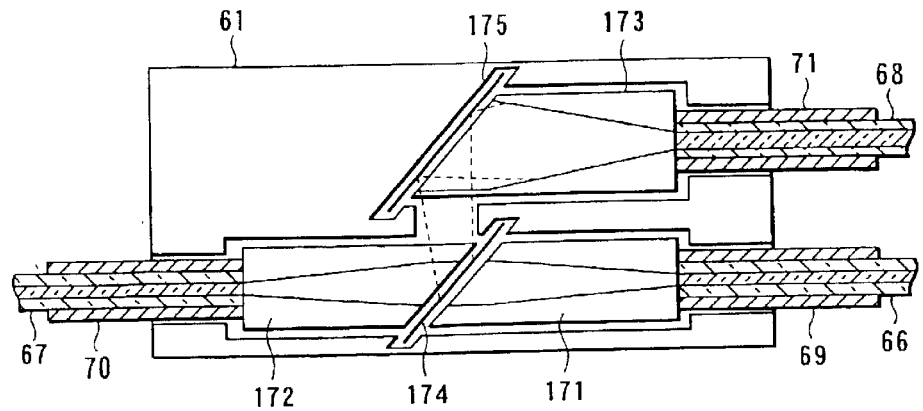
FIG. 21 is a sectional view of the configuration shown in FIG. 29.

FIG. 20 is a perspective view useful in describing a third embodiment of the optical multi/demultiplexer of the present invention. FIG. 21 is a sectional view of the second embodiment. In the following description, the same functional sections as those in FIG. 9 are denoted by the same reference numerals.

This optical multi/demultiplexer differs from the optical multi/demultiplexer in FIG. 9 in that it instead of being converted into parallel light and then transmitted through or reflected by the mirrors, light exiting the optical fiber has its beam diameter increased using a tapered optical waveguide and has its spread angle reduced before being transmitted through or reflected by the mirrors. When the entrance diameter of the tapered optical waveguide is defined as Ri, the exit diameter thereof is defined as Ro, the spread angle of light upon incidence is defined as θi, and the spread angle of light upon exit is defined as θo, the relationship between these parameters is expressed as follows:

$$Ri \cdot \sin(\theta i) = Ro \cdot \sin(\theta o) \quad (1)$$

In FIGS. 20 and 18, reference numerals 171 to 173 denote tapered optical waveguides. The core diameter of each tapered optical waveguide on its side that contacts with the optical fiber 66 to 68 equals that of the corresponding optical fiber. Reference numerals 174 and 175 denote mirrors composed of a glass plate having a reflection film formed on a surface thereof by vapor deposition. The mirror 174 has such wavelength selectivity as allows light exiting the optical fiber 66 to pass therethrough, while reflecting light exiting the optical fiber 67. The mirror 175 is set to reflect the light exiting the optical fiber 67.

The operation of the optical multi/demultiplexer in FIG. 20 will be described with reference to FIG. 21. Light exiting the optical fiber 66 has its beam diameter increased by the tapered optical waveguide 171, and is then transmitted through the mirror 174. The light subsequently has its beam diameter reduced by the tapered optical waveguide 172, and is then incident on the optical fiber 67. A gap corresponding to the thickness of the mirror 174 is provided between the tapered optical waveguides 171 and 172. However, since the beam diameter is increased according to Equation (1) to reduce the spread angle of light, the waveguides can be optically joined together with reduced losses.

On the other hand, light exiting the optical fiber 67 has its beam diameter increased by the tapered optical waveguide 172, and is then transmitted through the mirrors 174 and 175. The light subsequently has its beam diameter reduced by the tapered optical waveguide 173, and is then incident on the optical fiber 68. The optical distance between the optical waveguides 172 and 173 is larger than that between the optical waveguides 171 and 172. Thus, the beam diameter increases after the light has exited the optical waveguide 172 and before it reaches the optical waveguide 173. However, owing to the large core diameter of the optical fiber 68, it is possible to increase the core diameter of the optical waveguide 173. Thus, the light exiting the optical fiber 67 can be optically coupled to the optical fiber 68 with reduced losses by increasing the core diameter of the mirror 175 of the optical waveguide 173 above the beam diameter.

To assemble the optical multi/demultiplexer, the mirrors 174 and 175 are fitted in the recess in the substrate 61, and the tapered optical waveguides 171 to 173 and the optical fibers 66 to 68 are mounted in the substrate 61. Then, the tapered optical waveguides 171 and 172 are fixed to the mirror 174 with adhesive so as to be bonded thereto. The tapered optical waveguide 173 is fixed to the mirror 175 with adhesive so as to be bonded thereto. The cover 78 is set on and fixed to the substrate 61 to complete the assembly.

Figure 22:
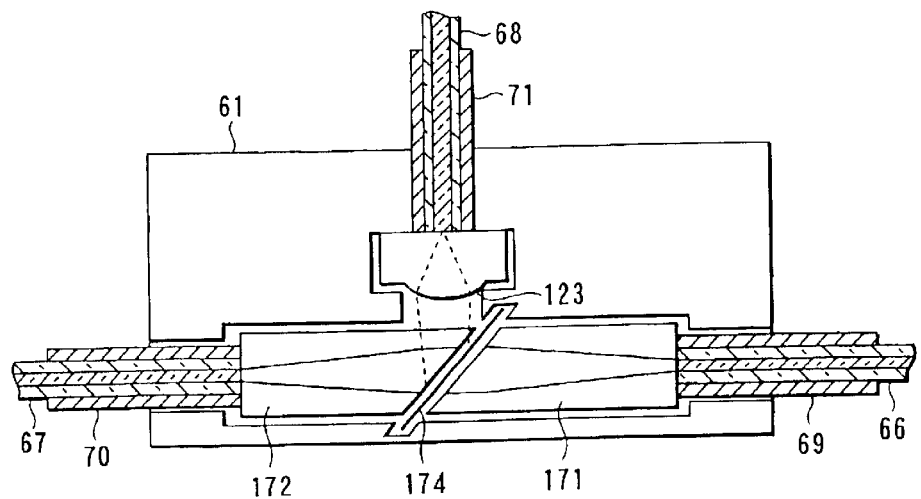
FIG. 22 is a sectional view useful in describing a variation of the configuration shown in FIG. 20.
Figure 23:
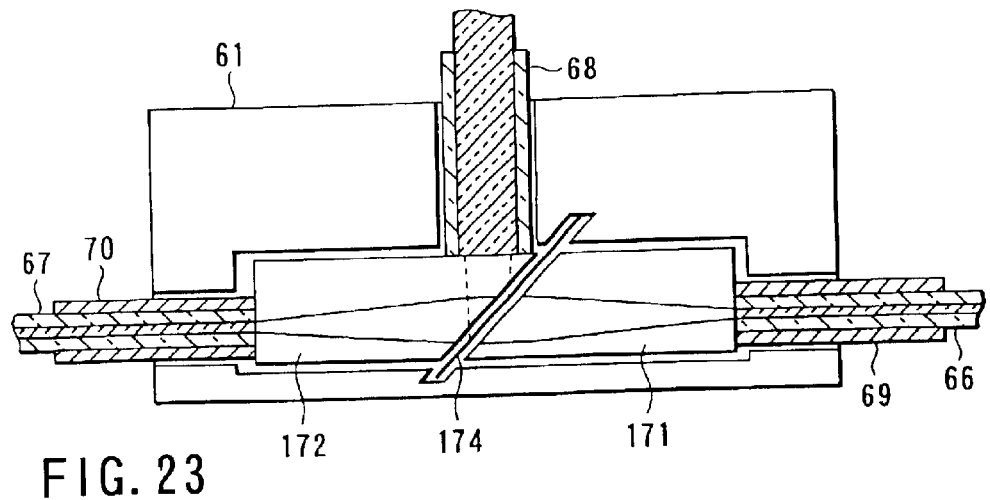
FIG. 23 is a sectional view useful in describing another variation of the configuration shown in FIG. 20.

FIG. 22 is a sectional view of a variation of the optical multi/demultiplexer in FIG. 20. FIG. 23 is a sectional view of another variation of the optical multi/demultiplexer in FIG. 20. In the example in FIG. 22, light exiting the optical fiber 67 and then reflected by the mirror 174 is condensed by the convex lens 123 so as to be incident on the optical fiber 68. In the example in FIG. 23, the optical fiber 68 has a larger core diameter than the optical fiber in FIG. 22, and the convex lens 123 may be omitted. Light exiting the optical fiber 67 and then reflected by the mirror 174 is directly incident on the optical fiber 681 as it is. The optical operation of each variation is the same as that described above.

Figure 24:
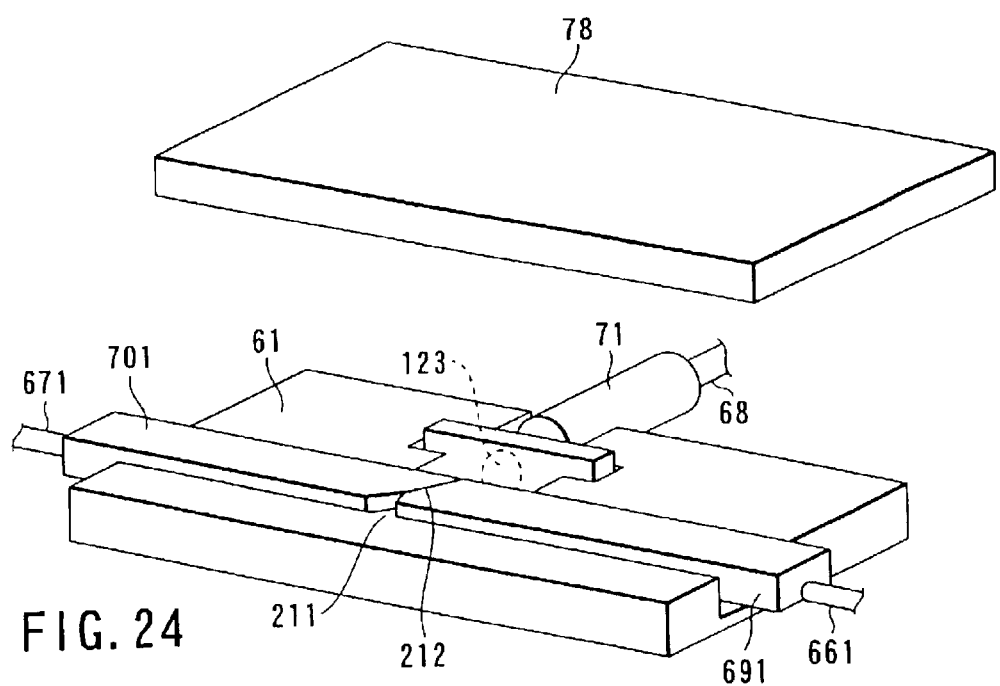
FIG. 24 is perspective view useful in describing a fourth embodiment of the optical multi/demultiplexer according to the present invention.
Figure 25:
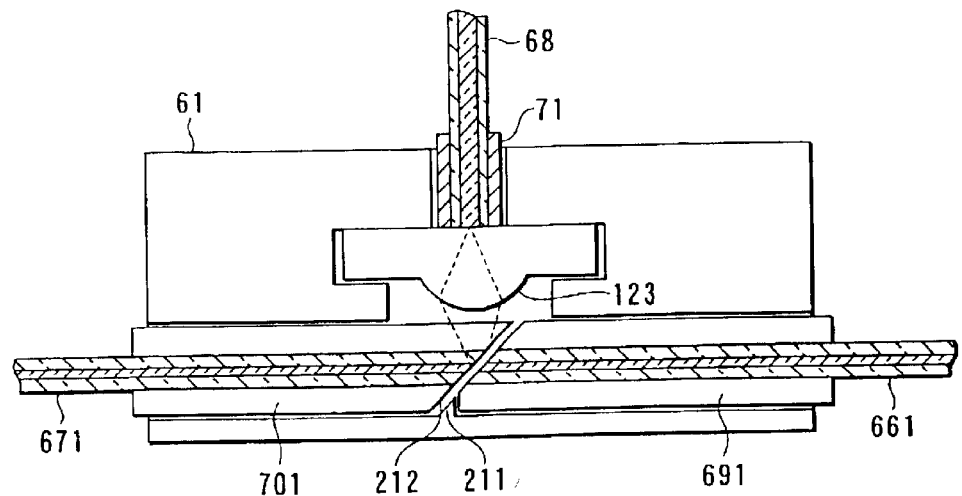
FIG. 25 is a sectional view of the configuration shown in FIG. 24.

FIG. 24 is a perspective view useful in describing a fourth embodiment of the optical multi/demultiplexer of the present invention. FIG. 25 is a sectional view of the fourth embodiment. In the following description, the same functional sections as those in FIG. 20 are denoted by the same reference numerals. This embodiment differs from the above embodiments in that mirrors are formed by vapor-depositing material formed into the mirrors, directly on cut surfaces of optical fibers and ferules.

That is, in FIGS. 24 and 25, reference numerals 691 and 701 denote ferules. With an optical fiber 661 inserted into and fixed to the ferule 691, tip portions of both optical fiber 661 and ferule 691 are polished so as to be tilted at 45° from the corresponding original surfaces. Further, the ferule 691 has a notch at the tip thereof. Accordingly, when the ferule 691 is mounted in the substrate 61, a stopper 211 on the substrate engages with the notch. Consequently, the tip position of the ferule 691 can be set. With an optical fiber 671 inserted into and fixed to the ferule 701, a tip portion of the optical fiber 671 is polished so as to be tilted at 45° from the corresponding original surface. The mirror 212 is formed on this polished facet by vapor deposition. The mirror 212 has such wavelength selectivity as allows light exiting the optical fiber 661 to pass therethrough, while reflecting light exiting the optical fiber 671. The optical fibers 661 and 671 are bonded to each other via the mirror 212.

The operation of the optical multi/demultiplexer of the fourth embodiment will be described with reference to FIG. 25. Light exiting the optical fiber 661 is transmitted through the mirror 212 and is then incident on the optical fiber 671. Owing to butt joining, the optical fibers 661 and 671 are optically connected together with reduced losses.

Light exiting the optical fiber 671 is reflected by the mirror 212 and then condensed by the convex lens 123 so as to be incident on the optical fiber 68. The positional deviations of the mirror 212 and convex lens 123 may affect the position of light incident on the optical fiber 68. However, since the optical fiber 68 has a larger core diameter than the optical fiber 671, the positional deviations of the mirror 212 and convex lens 123 can be absorbed.

To assemble the optical multi/demultiplexer, the optical fiber 661 integrated with the ferule 691 is fitted in the substrate 61 and fixed thereto with adhesive while being pressed against the stopper 211. Then, the optical fiber 671 integrated with the ferule 701 is fitted in the substrate 61 and fixed thereto with adhesive while being pressed against the optical fiber 661. The cover 78 is set on the substrate 61 to complete the assembly.

Figure 26:
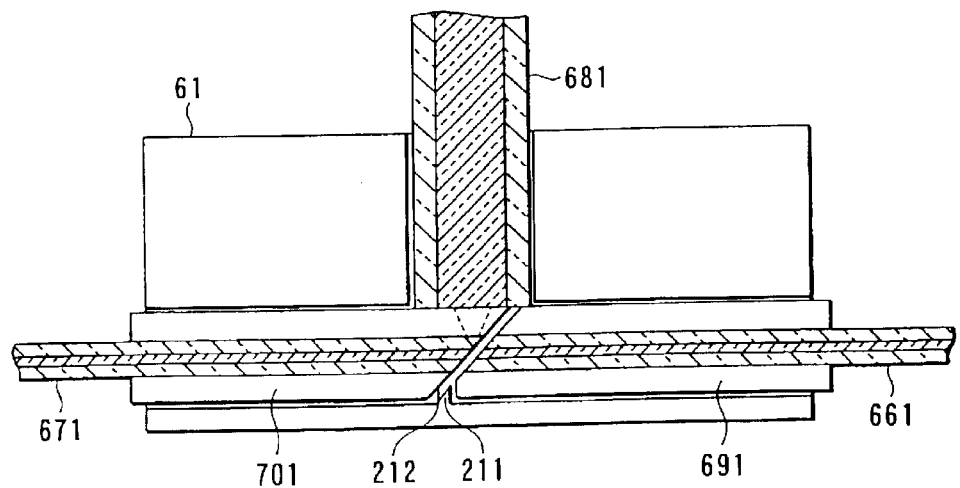
FIG. 26 is a sectional view useful in describing a variation of the configuration shown in FIG. 24.

FIG. 26 is a sectional view useful in describing a variation of the optical multi/demultiplexer in FIG. 24. In this figure, the optical fiber 681 has a larger core diameter than the optical fiber in FIG. 24. Light exiting the optical fiber 671 and then reflected by the mirror 212 is directly incident on the optical fiber 68 as it is. Accordingly, the convex lens 123 and the ferule 71 may be omitted.

Also in the second to fourth embodiments of the optical multi/demultiplexer of the present invention, an optical multi/demultiplexer for use in the fiber laser apparatus in FIG. 8 can be implemented by mounting another optical fiber in the substrate 61 so as to rest opposite the optical fiber 68 or 681.

As described above, in the fiber laser apparatus that is excited using two wavelengths according to the present invention, light is not output from the facets of the fiber but the opposite facets thereof are used to allow excitation light to enter the fiber therethrough. Consequently, incidence efficiency can be improved to increase excitation light power (optical density).

Further, in the fiber laser apparatus in which excitation light is incident on the rare earth doped optical fiber from the opposite sides thereof, the entrance and exit systems can be optically coupled together with reduced losses.

The above described fiber laser apparatus provides blue (B) emission color. However, a laser apparatus has been developed which provides read (R) and green (G) colors.

Figure 27:
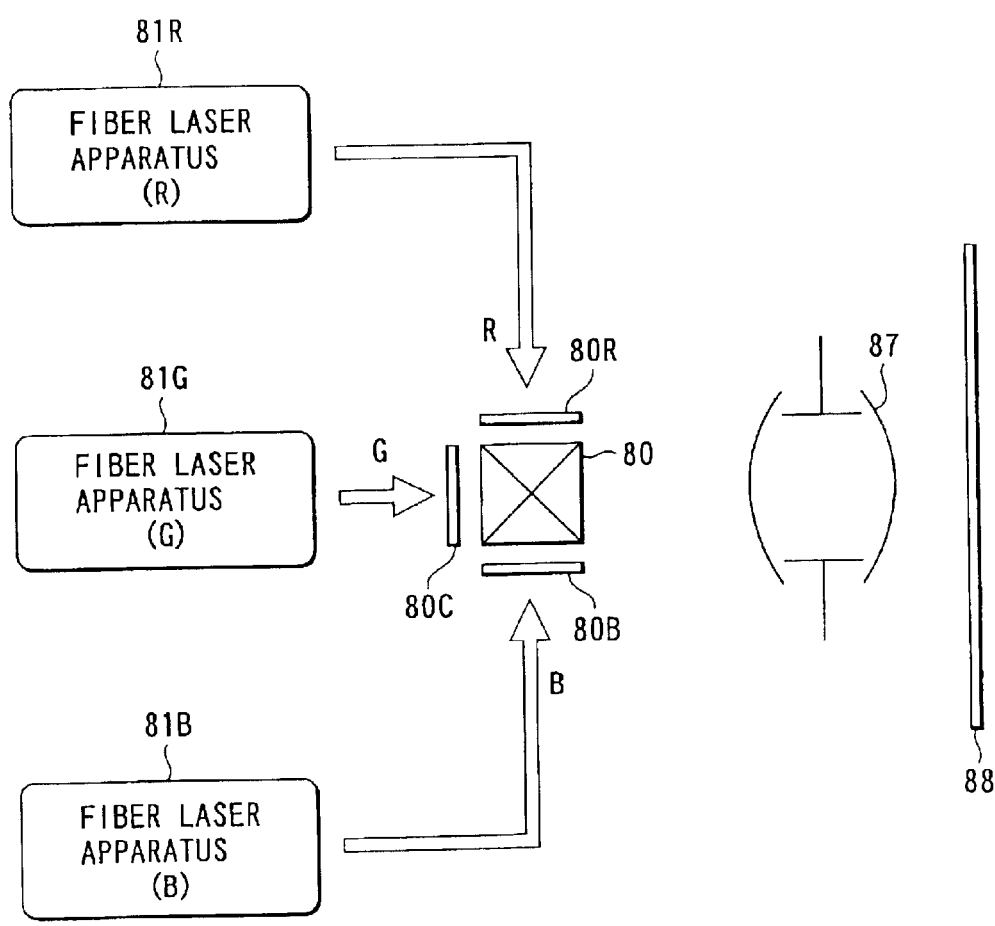
FIG. 27 is a diagram useful in describing an example of the configuration of an image display apparatus according to the present invention.

FIG. 27 shows an example of the configuration of an image display device using the above described fiber laser apparatus. Reference numerals 81R, 81G, and 81B denote fiber laser apparatuses that emit an R, G, and B laser beams, respectively, through tips thereof.

Laser lights are applied to space modulating elements 80R, 80G, and 80B such as liquid crystal panels. Thus, an R, G, B optical images are incident on a synthesizing prism 80. The synthesizing prism 80 provides a colored optical image. The image is then projected on a screen 88 via a projection lens 87. An optical image may be formed using reflection type mirror devices instead of the liquid crystal panels. Further, the space modulating elements 80R, 80G, and 80B are supplied with an R, G, and B image signals by an image processing circuit (not shown).

Figure 28:
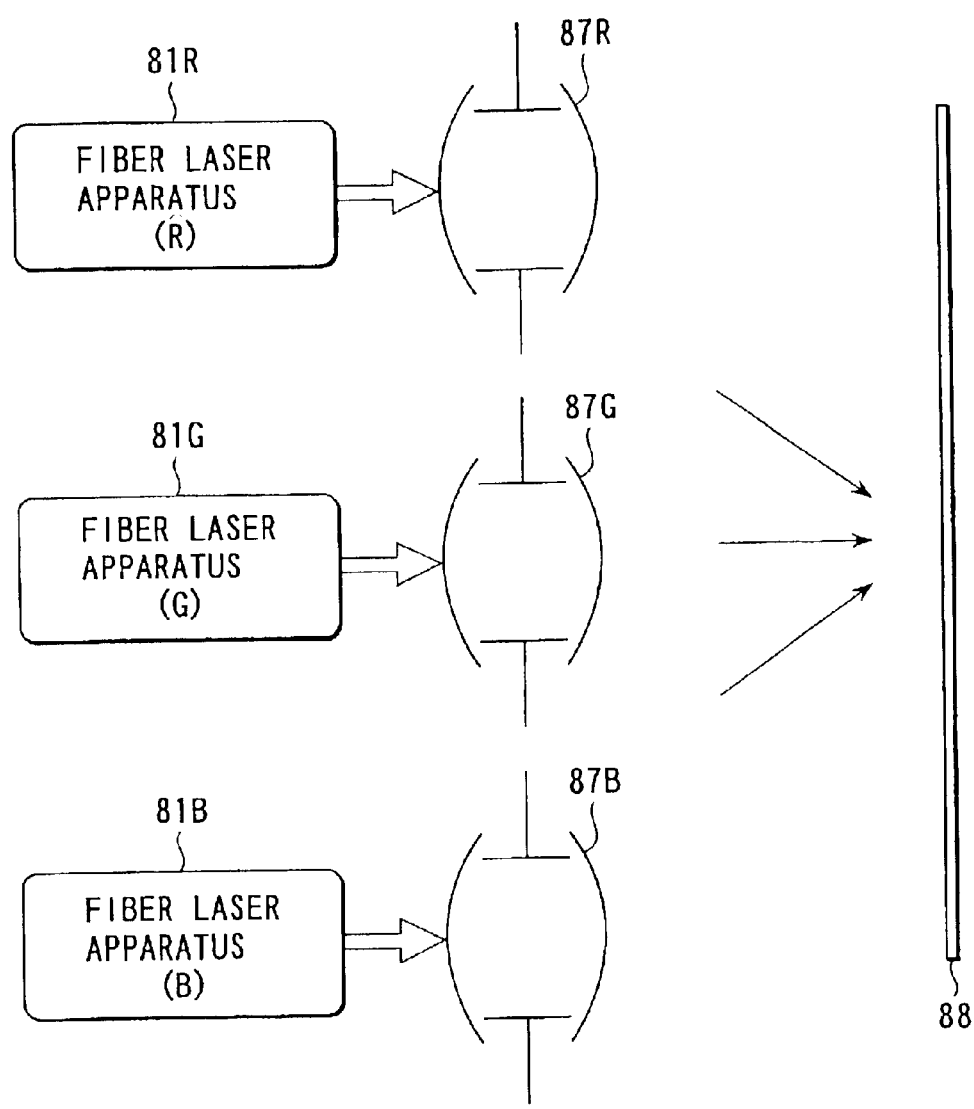
FIG. 28 is a diagram useful in describing another example of the configuration of the image display apparatus according to the present invention.

FIG. 28 shows another image display apparatus to obtain a colored image. Reference numerals 8R, 8G, and 8B denote fiber laser apparatuses that provide red, green, and blue laser lights, respectively. The configuration of each fiber laser apparatus is the same as that shown in FIG. 27. However, taken out laser lights R, G, and B are projected on the screen via projection lenses 87R, 87G, and 87B. The present invention is not limited to the above described embodiments, but three fiber laser apparatuses may irradiate one common color liquid crystal panel with laser beams.

As described above, according to the present invention, two excitation light sources that emit lights of different wavelengths are used to obtain a light beam of the desired wavelength (color) on the basis of light resonance effected using the excitation light source. An apparatus is obtained which provides light with sufficient power and which has a simple configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fiber laser apparatus, comprising:
   a first excitation light source;
   a first optical fiber on which light from the first excitation light source is incident through one facet of the first optical fiber, in which light resonance with predetermined wavelength selected in advance occurs in a core doped with a rare earth substance, and in which a light resonant section is formed to output light of a resonant wavelength from the other facet of the first optical fiber;
   a second excitation light source;
   an optical multi/demultiplexer, including:
      a first facet on which light of a predetermined wavelength emitted from the other facet of the first optical fiber is incident,
      a second facet which is provided at a predetermined angle to the first facet, and
      a third facet, which is provided opposite to the first facet, and on which light emitted from the second excitation light source is incident, the optical multi/demultiplexer emitting the light of a predetermined wavelength incident on the first facet from the second facet as well as causing the light, which was emitted from the second excitation light source and incident into the third facet, to pass through the first facet and to be supplied to the light resonant section from the other facet of the first optical fiber; and
   a second optical fiber which guide the light of a predetermined wavelength emitted from the second facet of the optical multi/demultiplexer to the exterior.

2. A fiber laser apparatus according to claim 1, wherein lights from the first and second excitation light sources have different wavelengths an each excite electrons in the rare earth substance in the core to generate light of the selected wavelength in the resonant section.

3. A fiber laser apparatus, comprising:
   a first excitation light source including:
      first exciting means for emitting light of a first wavelength,
      first condensing means for condensing light emitted by the first exciting means, and
      a first optical fiber, which includes a first light resonant section, on which the light condensed by the first condensing means is incident from one facet of the first optical fiber and in which light resonance with a second wavelength occurs in a core doped with a rare earth substance and a resonated light of a second wavelength is emitted from the other facet of the first optical fiber;
   a second excitation light source including:
      second exciting means for emitting light of a third wavelength;
      second condensing means for condensing the light emitted by the second exciting means; and
      a second optical fiber, which includes a second light resonant section, on which the light condensed by the second condensing means is incident from one facet of the second optical fiber, and in which light resonance with a fourth wavelength occurs in a core doped with a rare earth substance and a resonated light of a fourth wavelength is emitted from the other facet;
   a third optical fiber including a third light resonant section, on which the light of a second wavelength emitted from the first optical fiber is incident from one facet of the third optical fiber, and in which light resonance with a fifth wavelength selected in advance occurs in a core doped with a rare earth substance and a light having a resonant wavelength is emitted from the other facet;
   an optical multi/demultiplexer including:
      a first facet on which light of a fifth wavelength emitted from the third optical fiber is incident,
      a second facet which is provided at a predetermined angle to the first facet, and
      a third facet provided opposed to the first facet and on which light of fourth wavelength emitted from the second optical fiber is incident, wherein the optical multi/demultiplexer emits the light of the fifth wavelength incident on the first facet from the second facet, as well as causing the light of the fourth wavelength, which was incident on the third facet, to pass through the first facet and to be supplied to the third light resonant section from the other facet of the third optical fiber, and
   a fourth optical fiber which guides the light of a fifth wavelength emitted from the second facet of the optical multi/demultiplexer to the exterior.

4. A fiber laser apparatus according to claim 3, where the optical resonator of at least one of the first and second optical fibers is configured to include the third optical fiber.

5. A fiber laser apparatus according to claim 3, wherein the first and third exciting means are semiconductor lasers.

6. A fiber laser apparatus according to claim 3, further comprising a multimode fiber having one end optically joined to an output side of said wavelength selection output means, and wherein laser light of the fifth wavelength is output from the other end of the multimode fiber.

7. A fiber laser apparatus according to claim 3, wherein the wavelength selection output means lights of the first wavelength and the third wavelength as well as light of the fifth wavelength.

8. A fiber laser apparatus according to claim 3, wherein the first wavelength and the third wavelength are between 820 and 1,000 nm, the second wavelength is 695 nm, the fourth wavelength is 635 nm, and the fifth wavelength is 455 nm.

9. A fiber laser apparatus according to claim 3, wherein the first optical fiber is doped with praseodymium ions and ytterbium ions as a rare earth substance, the second optical fiber is doped with praseodymium ions and ytterbium ions as rare earth ions, and the third optical fiber is doped with thulium ions as rare earth ions.

10. An optical multi/demultiplexer, comprising:
    a first face on which a light of a predetermined wavelength optically coupled with one facet of a first optical fiber and emitted from one facet of the first optical fiber is incident;
    a reflecting section which reflects light of a predetermined wavelength incident on the first face at a predetermined angle;

a second face provided at a predetermined angle to the first face, the second face being optically coupled with one facet of the second optical fiber, an causing the light of a predetermined wavelength reflected by the reflecting section to be incident on one facet of the second optical fiber; and a third face provided opposed to the first face, the third face being optically coupled with one facet of a third optical fiber, and causing a light emitted from one facet of the third optical fiber to be incident on one facet of the first optical fiber via the first face.

11. An optical multi/demultiplexer according to claim 10, wherein a lens is arranged at least either between the first optical I/O section and the reflecting section or between the second optical I/O section and the reflecting section or between the entrance facet of the second optical fiber and the reflecting section.

12. An optical multi/demultiplexer according to claim 10, wherein a lens is arranged at least either between the first optical I/O section and the reflecting section or between the second optical I/O section and the reflecting section or between the reflecting section and the entrance facet of the second optical fiber.

13. An optical multi/demultiplexer according to claim 12, wherein the first and second optical I/O sections are cut obliquely relative to the optical axis and are located opposite each other across the reflecting section.

14. An optical multi/demultiplexer according to claim 10, wherein the light of the selected wavelength guided to the exterior from the first optical fiber, the reflecting section, and the second optical fiber is blue laser light.

15. An optical multi/demultiplexer according to claim 10, wherein light of wavelength 635 nm from a first excitation light source is incident on the first optical fiber, and light of wavelength 695 nm from a second excitation light source is incident on the third optical fiber.

16. An optical multi/demultiplexer according to claim 15, wherein the first and second excitation light sources are fiber laser sections.

17. An image display apparatus comprising:

a first excitation light source;

a first optical fiber on which light from the first excitation light source is incident through one facet of the first optical fiber, in which light resonance with predetermined wavelength selected in advance occurs in a core doped with a rare earth substance, and in which a light resonant section is formed to output light of a resonant wavelength from the other facet of the first optical fiber;

a second excitation light source;

an optical multi/demultiplexer including:
  a first facet on which light of a predetermined wavelength emitted from the other facet of the first optical fiber is incident,
  a second facet which is provided at a predetermined angle to the first facet,
  a third facet which is provided opposed to the first facet and on which light emitted from the second excitation light source is incident, wherein the optical multi/demultiplexer causes the light of a predetermined wavelength incident on the first facet to be emitted from the second face, as well as supplying the light, which was emitted from the second excitation light source and incident into the third facet from the other facet of the first optical fiber, to the light resonant section passing through the first facet, and
  a second optical fiber which guides the light of a predetermined wavelength emitted from the second facet of the optical multi/demultiplexer to the exterior; and;

image display means for space-modulating the light of a predetermined wavelength guided by the second optical fiber based on an image signal and projecting the light onto a screen.

* * * * *